United States Patent
Herbach et al.

(10) Patent No.: US 11,074,918 B2
(45) Date of Patent: Jul. 27, 2021

(54) REAL-TIME AGREEMENT COMPREHENSION TOOL

(71) Applicant: Adobe Inc., San Jose, CA (US)

(72) Inventors: Jonathan David Herbach, Mountain View, CA (US); Saurabh Khurana, Belmont, CA (US); Ben Sidney Tepfer, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 158 days.

(21) Appl. No.: 16/362,465

(22) Filed: Mar. 22, 2019

(65) Prior Publication Data

US 2020/0302940 A1  Sep. 24, 2020

(51) Int. Cl.
| | |
|---|---|
| *G10L 15/22* | (2006.01) |
| *G06F 16/34* | (2019.01) |
| *G06Q 50/18* | (2012.01) |
| *G10L 17/22* | (2013.01) |
| *G10L 15/183* | (2013.01) |
| *G06F 40/205* | (2020.01) |

(52) U.S. Cl.
CPC ............ *G10L 17/22* (2013.01); *G06F 40/205* (2020.01); *G06Q 50/18* (2013.01); *G10L 15/183* (2013.01); *G10L 15/22* (2013.01); *G10L 2015/225* (2013.01); *G10L 2015/228* (2013.01)

(58) Field of Classification Search
CPC ... G10L 15/18; G10L 15/22; G10L 2015/221; G06F 16/243; G06F 16/248; G06F 16/34; G06Q 50/18
USPC ............... 704/257, 275, 270; 707/770, 769; 705/311
See application file for complete search history.

(56) References Cited

U.S. PATENT DOCUMENTS

| | | | |
|---|---|---|---|
| 7,707,153 B1* | 4/2010 | Petito | G06Q 10/10 |
| 8,239,413 B2* | 8/2012 | Hubert | G06F 16/38 |
| | | | 707/791 |
| 8,255,225 B2* | 8/2012 | Byford | G10L 15/22 |
| | | | 704/275 |
| 9,075,779 B2* | 7/2015 | King | G06Q 50/184 |

(Continued)

OTHER PUBLICATIONS

"Notice of Allowance", U.S. Appl. No. 15/167,694, dated Jan. 10, 2020, 9 pages.

(Continued)

*Primary Examiner* — Martin Lerner
(74) *Attorney, Agent, or Firm* — Fig. 1 Patents

(57) ABSTRACT

A real-time agreement comprehension tool is described. Initially, a user is selected as a signing party to an agreement. A document deployment system enables a computing device associated with the user to access the agreement. The computing device presents the agreement via a display device for digital signing by the user. While the agreement is presented, a voice assistant platform obtains a query from the user about at least a portion of the agreement. Responsive to the query, an agreement comprehension tool of the computing device determines an answer to the query by processing a limited set of documents that are relevant to the portion of the agreement. This limited set of documents includes a corpus of documents corresponding to the authoring organization and previous agreements with which the signing user has interacted. The agreement comprehension tool then causes the answer to be presented for display and/or audibly output.

20 Claims, 10 Drawing Sheets

(56) References Cited

U.S. PATENT DOCUMENTS

| | | | |
|---|---|---|---|
| 9,753,900 B2* | 9/2017 | Skirpa | G06F 40/14 |
| 10,482,180 B2* | 11/2019 | Santos Moraes | G06F 40/30 |
| 10,628,596 B2 | 4/2020 | Kumar et al. | |
| 2009/0281853 A1* | 11/2009 | Misvaer | G06Q 50/18 705/311 |
| 2012/0221641 A1* | 8/2012 | Richard | G06F 21/6245 709/204 |
| 2012/0246084 A1* | 9/2012 | Marshall | G06Q 30/02 705/313 |
| 2013/0254126 A1* | 9/2013 | Koenig | G06F 40/169 705/311 |
| 2013/0317994 A1* | 11/2013 | Tran | G06Q 50/184 705/310 |
| 2014/0304249 A1* | 10/2014 | Ayzenshtat | G06F 16/9535 707/709 |
| 2015/0172058 A1* | 6/2015 | Follis | G06F 21/64 713/176 |
| 2016/0012556 A1* | 1/2016 | Moore | G06F 40/166 705/311 |
| 2016/0048696 A1 | 2/2016 | Follis | |
| 2016/0124917 A1* | 5/2016 | Ducat | G06F 9/451 715/760 |
| 2016/0148159 A1* | 5/2016 | Coffing | G06Q 50/182 705/301 |
| 2016/0343367 A1* | 11/2016 | Cecchi | G10L 13/04 |
| 2017/0083867 A1* | 3/2017 | Saxena | G06Q 10/103 |
| 2017/0344245 A1 | 11/2017 | Kumar et al. | |
| 2019/0005138 A1* | 1/2019 | Andreica | G10L 15/22 |
| 2019/0114357 A1* | 4/2019 | Riaz | G06F 16/3349 |
| 2019/0114370 A1* | 4/2019 | Cerino | G06F 40/205 |
| 2019/0251182 A1* | 8/2019 | Ray | G06F 40/30 |
| 2020/0243174 A1* | 7/2020 | Burgess | G06F 40/279 |
| 2020/0342039 A1* | 10/2020 | Bakir | G06F 40/35 |

OTHER PUBLICATIONS

"Pre-Interview First Office Action", U.S. Appl. No. 15/167,694, dated Jan. 14, 2019, 3 pages.

"First Action Interview Office Action", U.S. Appl. No. 15/167,694, dated Jul. 8, 2019, 3 pages.

* cited by examiner

REAL-TIME AGREEMENT COMPREHENSION TOOL

BACKGROUND

Advances in computing technology enable various computing devices to reliably authenticate users, i.e., to verify the users' respective identities or, in other words, to confirm that users are who they say they are. Based, in part, on the ability of computing systems to reliably verify that users "are who they say they are," many concerns about leveraging these computing systems for obtaining digital signatures on binding agreements (e.g., contracts) are largely overcome. To the extent that these concerns have been largely overcome, and because enabling parties to sign agreements digitally is significantly more convenient than requiring parties to sign paper agreements in person, the use of digital agreements to bind parties to the terms of these agreements has become widespread.

Traditionally, parties that entered into binding agreements did so, in part, by reviewing paper copies of the agreements and signing these agreements in the presence of at least one party seeking to bind the signing party. This conventional process, conducted in person, provides a signing party the opportunity to ask questions of another party about the agreement. By enabling the signing party to ask questions and have them answered in real time, the parties are able to come to a mutual understanding of the agreement's terms and thus understand "what they are getting into" by signing. In contrast to this, computing systems display digital agreements, surface navigation controls that allow easy and quick navigation through the digital agreements, and provide functionality to digitally sign the agreements, such as by allowing a user to provide his or her signature in a designated box with a finger via a touch-enabled display or by simply clicking a button presented via the user interface with the phrase "I Agree." Due to this functionality, users of conventional digital-agreement signing systems often simply scroll through agreements with very little or no review and digitally sign the agreements. By way of example, this series of steps is performed mindlessly by many users in connection with end-user license agreements (EULAs). Regardless, conventional systems do not provide functionality for a signing party to ask questions of another party to the agreement about portions of the agreement which are unclear to the signing party. As such, conventional digital-agreement signing systems can cause parties to sign agreements without mutual understandings of those agreements. This can render the agreements invalid, causing them to thus be unenforceable in some circumstances.

SUMMARY

To overcome these problems, a real-time agreement comprehension tool is leveraged in a digital medium environment. Initially, a user or an organization (for which the user is an agent with signing authority) is selected as a signing party to an agreement by a user of an authoring organization. A document deployment system communicates the agreement to a computing device associated with the user or otherwise enables the computing device to access the agreement. The computing device presents the agreement via a display device for digital signing by the user. While the agreement is presented, a voice assistant platform obtains a query from the user about at least a portion of the agreement, e.g., a question about the portion.

Responsive to the query, an agreement comprehension tool of the computing device determines an answer to the query by processing a limited set of documents that are relevant to the portion of the agreement. In one or more implementations, the agreement comprehension tool processes this limited set of documents using natural language processing (NLP). This limited set of documents includes a corpus of documents corresponding to the authoring organization as well as previous agreements with which the signing user has interacted. By limiting the documents processed to this highly relevant set, the agreement comprehension tool is better able to leverage semantics, determined using NLP, to facilitate comprehension of the agreement than when a large set of generic documents is leveraged. The agreement comprehension tool then causes the answer to be presented for display via the display device and/or audibly output via the voice assistant platform, e.g., via a voice assistant device corresponding to the voice assistant platform.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
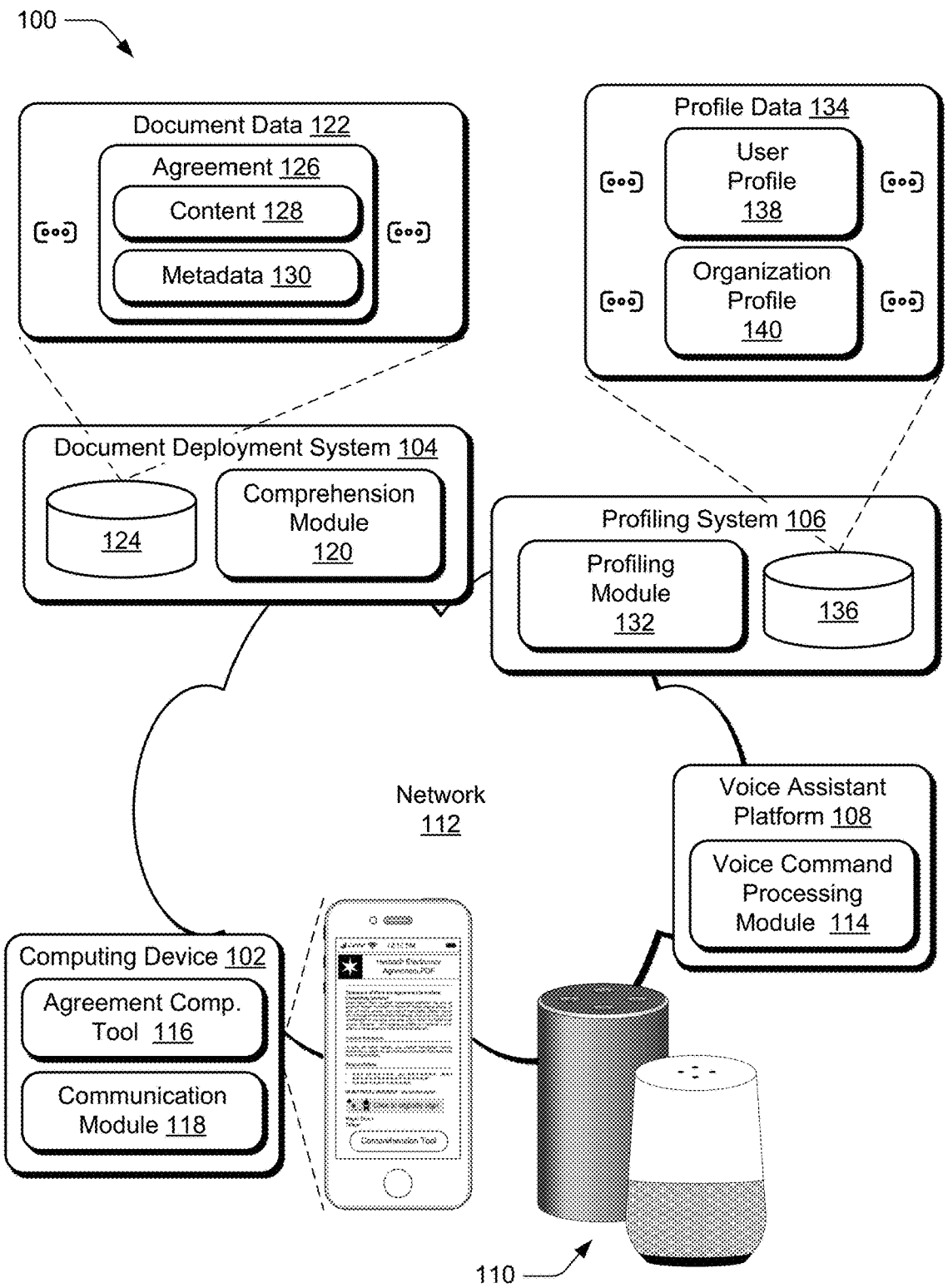
FIG. 1 is an illustration of an environment in an example implementation that is operable to employ techniques described herein.

The use of digital agreements to bind parties to the terms of these agreements has become widespread. In practice, computing systems display the digital agreements, surface navigation controls that allow easy and quick navigation through these agreements, and provide functionality to digitally sign them, such as by allowing a user to simply click a button presented via a user interface with the phrase "I Agree." Due to this functionality, users of conventional digital-agreement signing systems often simply scroll through agreements with very little or no review and digitally sign the agreements. However, conventional systems do not provide functionality for a signing party to ask questions of another party to the agreement about portions of the agreement which are unclear to the signing party. Consequently, conventional digital-agreement signing systems cause parties to sign agreements without mutual understandings of those agreements. In other words, these systems often fail to produce a "meeting of the minds" between the parties to the agreement. This can render the agreements invalid, causing them to thus be unenforceable in some circumstances.

To overcome these problems, a real-time agreement comprehension tool is leveraged in a digital medium environment. Initially a user is selected as a signing party to an agreement by a user of an authoring organization. In accordance with the described techniques, a document deployment system serves as a repository of documents (including the agreement) for the authoring organization and, responsive to selection of the user as the signing party, enables a computing device associated with the signing user to access the agreement, e.g., for review and to obtain a digital signature. By way of example, the document deployment system generates an email that is received by the signing user's computing device and includes a link for accessing the agreement. Additionally or alternately, the document deployment system attaches the agreement to the email. The document deployment system may provide access to an agreement in a variety of ways without departing from the spirit or scope of the techniques described herein.

After access to the agreement is received, the computing device presents the agreement via a display device for signing by the user, such as responsive to selection of a link to the agreement or opening an attachment comprising the agreement. The described systems present the agreement via a user interface which enables the user to navigate through the agreement to review content of the agreement, e.g., terms of the agreement. By way of example, the user interface may be configured to receive navigation inputs for scrolling through the agreement, zooming in on portions of the agreement, finding terms in the agreement, and so forth.

In accordance with the described techniques, the system receives a query from the user about a portion of the agreement while the agreement is being presented via the display device. In at least some implementations, this query is received responsive to the user verbally asking a question. Here, a voice assistant platform obtains the query about the portion of the agreement, in part, by converting the verbally asked question into digital form using speech-to-text capabilities. The voice assistant platform then provides the query to an agreement comprehension tool of the computing device, e.g., via an application programming interface (API). It is to be appreciated that the agreement comprehension tool may obtain queries from signing users in other ways without departing from the spirit or scope of the techniques described herein, such as via a text-based instrumentality.

In any case, responsive to the query, the agreement comprehension tool determines an answer to the query. To determine the answer, the agreement comprehension tool processes a limited set of documents that are relevant to the portion of the agreement about which the user queries. This limited set of documents includes a corpus of documents corresponding to the authoring organization as well as previous agreements with which the signing user has interacted. In one or more implementations, the limited set of documents also includes a corpus of documents corresponding to an organization associated with the signing user, such as an employer which the signing user effectively binds by signing the agreement. Additionally or alternately, the limited set of documents can include manually selected or uploaded documents, such as a digital version of a previously signed paper contract scanned and uploaded by the signing user or another user in the signing user's organization. The limited set of documents can include documents that are manually selected in other ways by a user or an organization associated with the user within the spirit and scope of the described techniques.

Generally speaking, this set of documents processed by the agreement comprehension tool is maintained by the document deployment system and is provided to the agreement comprehension tool responsive a request to invoke the agreement comprehension tool, e.g., responsive to receiving the query. The agreement comprehension tool is further configured to use natural language processing (NLP) and other machine-learning techniques to process this limited set of documents in order to determine the answer to the user's query in real time. Once the answer is determined, the agreement comprehension tool presents the answer to the user. By way of example, the agreement comprehension tool causes the answer to be displayed via the display device of the user's computing device. Additionally or alternately, the agreement comprehension tool causes the answer to be audibly output via the voice assistant platform, e.g., via a voice assistant device corresponding to the voice assistant platform.

By receiving questions from users about agreements and then, in real time, determining answers to the questions and presenting the answers via one or more interfaces, the agreement comprehension tool conducts a dialogue with a signing party to an agreement. One practical application of the agreement comprehension tool is thus in connection with functionality to digitally sign agreements in order to produce a meeting of the minds between parties to such agreements. Indeed, the agreement comprehension tool produces this meeting of the minds by displaying or audibly outputting answers to questions about an agreement and also by presenting excerpts to support the answers, which is effective to cause the parties to the agreement to come to a mutual understanding of the agreement's terms and thus understand "what they are getting into" by signing. By eliminating the argument that the terms of digitally signed agreements are not mutually understood, the agreement comprehension tool renders more agreements entered into with digital signatures valid. As a result of producing valid agreements, the agreement comprehension tool also enables digitally signed agreements to be enforceable.

Term Descriptions

As used herein, the term "document" refers to an electronically memorialized representation of thought. Additionally, a document may be formatted in a variety of different ways capable of including various types of digital content, such as text, images, tables, hyperlinks, and so forth. Examples of underlying document structure include word processing documents, spreadsheets, web pages, and so forth. Example file types include Microsoft® Word documents (e.g., .docx), Portable Document Format (.pdf) files, text (.txt) files, and so forth. By way of example, "documents" may include agreements, bills of sale, corporate policy handbooks, operation manuals, assembly instructions, warranties, strategic mission descriptions, memoranda, emails, and so forth. Certainly, "documents" may include a variety of other electronically memorialized items without departing from the spirit or scope of the techniques described herein.

As used herein, an "agreement" refers to particular type of document. In particular, an "agreement" refers to a memorialized understanding between parties. A "contract" is an example of an agreement, and is a legally-binding agreement which recognizes and governs the rights and duties of the parties to the agreement. One example of a contract is an end-user license agreement (EULA) between a licensor of software and its end user (e.g., a purchaser), establishing the end user's right to use the software. The described agreement comprehension tool may be leveraged in relation to a variety of different types of agreements to facilitate comprehension of them without departing from the spirit or scope of the described techniques.

As used herein, the term "digitally sign" refers to the use of electronic means to agree to the terms of an agreement and a "digital signature" refers to an indication captured in data of use of those electronic means to effectively agree. Examples of digital signing may include providing a signature in a designated box with a finger via a touch-enabled display, simply clicking a button presented via the user interface with the phrase "I Agree," using local or cloud-based Public Key Infrastructure (PKI), and so forth. It is to be appreciated that users may digitally sign agreements in different ways without departing from the spirit or scope of the described techniques.

As used herein, the term "agent" refers to a person or entity that is authorized to act on behalf of another person or entity, such as to legally bind the other person or entity to terms of an agreement, e.g., by signing the agreement.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ a real-time agreement comprehension tool as described herein. The illustrated environment 100 includes computing device 102, document deployment system 104, profiling system 106, voice assistant platform 108 and various voice assistant devices 110 that are communicatively coupled, one to another, via a network 112. It is to be appreciated that although the profiling system 106 is illustrated as separate from the document deployment system 104, the profiling system 106 and the document deployment system 104 may additionally or alternately be included as part of a common service provider system without departing from the spirit or scope of the described techniques.

Devices that are usable to implement the computing device 102, the document deployment system 104, the profiling system 106, and the voice assistant platform 108 may be configured in a variety of ways. These devices, for instance, may be configured as a desktop computer, a laptop computer, a mobile device (e.g., assuming a handheld configuration such as a tablet or mobile phone), and so forth. Thus, the device may range from full resource devices with substantial memory and processor resources (e.g., personal computers, game consoles) to low-resource devices with limited memory and/or processing resources (e.g., mobile devices). Additionally, a device may be representative of a plurality of different devices, such as multiple servers utilized by a business to perform operations "over the cloud" as further described in relation to FIG. 10.

The voice assistant devices 110 may also be configured in a variety of ways. Generally speaking, the voice assistant devices 110 are configured with one or more microphones to receive voice commands from a user. Examples of dedicated voice assistant devices 110 include the Amazon® Echo and Google® Home, which enable interactions with voice assistant platforms Amazon® Alexa and Google® Assistant, respectively. Other devices, such as mobile phones, desktop computers, laptop computers, gaming systems, and so forth may also be configured as voice assistant devices 110 capable of leveraging the functionality of a voice assistant platform. In such scenarios, the voice assistant platform may leverage native audio hardware of these devices to enable them to serve as voice assistant devices 110. In accordance with the techniques discussed herein, the computing device 102, for instance, may be capable of leveraging the functionality of a voice assistant platform 108. By way of example, various mobile phones may serve as voice assistant devices 110 by including executable code that enables a user to interact with Cortana®, a voice assistant platform of Microsoft®. As another example, an Apple® iPhone (a mobile phone) may serve as a voice assistant device 110, enabling a user to interact with the voice assistant platform Siri®. To this end, the voice assistant devices 110 can be configured to receive user input through interfaces (e.g., touch, camera, etc.) in addition to receiving voice commands.

In any case, these voice assistant devices 110 interact with their respective voice assistant platform 108 to respond to voice commands. The voice assistant platform 108 is illustrated having voice command processing module 114. The voice command processing module 114 represents functionality to receive a request initiated by a voice command, determine how to respond to the request, and provide a response to the voice assistant device 110 or any other devices that may be affected by the voice command, such as appliances within a connected home, service provider devices providing one or more respective services (e.g., facilitating delivery of goods by an e-commerce platform), and so on. Accordingly, the voice assistant devices 110 may be configured to respond to a user's voice commands in myriad ways, such as by outputting an audible (voice) response via one or more speakers, displaying visual content, providing other visual effects (e.g., indications via light emitting diodes (LEDs)), providing tactile feedback, and so forth. Voice commands may be leveraged in a variety of settings (e.g., work, home, etc.) to initiate responses via one or more devices, including, but not limited to the computing device 102 and/or the voice assistant devices 110.

In accordance with the described systems, for instance, voice commands may be leveraged in connection with surfacing information to facilitate comprehension of agreements, such as contracts and other instruments leveraged to memorialize an understanding between two or more parties. In addition, the real-time comprehension techniques described herein may also be leveraged in relation to various other types of documents to facilitate their comprehension. Some examples of these other types of documents include bills of sale, corporate policy handbooks, operation manuals, assembly instructions, warranties, and so forth.

The computing device 102 is illustrated with an agreement comprehension tool 116, which represents functionality to receive user input in relation to an agreement, and in real time, determine information to provide (if any) to facilitate comprehension of the agreement and when to provide this information. The agreement comprehension tool 116 also represents functionality to output determined information via one or more identified user interfaces. In one or more implementations, the agreement comprehension tool 116 interacts with the document deployment system 104 to facilitate agreement comprehension. The agreement comprehension tool 116 may also (e.g., via the document deployment system 104 or directly over the network 112) leverage functionality of the profiling system 106 and the voice assistant platform 108 in connection with facilitating agreement comprehension.

In the illustrated example, the computing device 102 is also depicted having a communication module 118, which represents functionality of the computing device 102 to communicate information to and receive information from other devices such as service provider systems. In relation to the illustrated environment 100, the communication module 118 represents functionality of the computing device 102 to send information to and receive information from the document deployment system 104, the profiling system 106, and the voice assistant platform 108. On behalf of the agreement comprehension tool 116, for instance, the communication module 118 can communicate data to the document deployment system 104, such as data corresponding to a question asked by a user about an agreement and captured using speech recognition functionality. The communication module 118 can also receive data from the document deployment system 104 such as agreements (e.g., contracts) in digital format, information that enables the agreement comprehension tool 116 to provide answers to a user's questions, and so forth.

The document deployment system 104 includes comprehension module 120, which operates in concert with the agreement comprehension tool 116 to expose information via the computing device 102 to facilitate agreement comprehension. The document deployment system 104 is also illustrated having document data 122 which is illustrated in storage 124. In one or more implementations, the document deployment system 104 includes functionality to act as a document repository, such as to provide a document repository service "over the cloud" to clients that sign up for and/or purchase the service. By way of example, an organization (an enterprise) may establish an account with the document deployment system 104, which allows the organization to upload authored agreements (e.g., contracts) to the system for storage in the storage 124, to provide input to expose various ones of the maintained agreements to specified users (e.g., a user of the computing device 102 that is a "signing party" to the agreement), and to manage interactions of the signing-party user with the agreement. As discussed above and below, this functionality can be useful for organizations that leverage these agreements, such as by enabling those organizations to author agreements and then propagate them to users that are signing parties to the agreements.

To this end, the document data 122 includes agreements 126. The document data 122 is illustrated with ellipses to indicate that multiple agreements 126 can be included in the document data 122. As illustrated, the agreement 126 includes content 128 and metadata 130. Broadly speaking, the content 128 represents primary portions of the agreement 126 presented to users via a user interface. Consider an example in which the agreement 126 is a contract. In this example, content 128 includes the text of the contract, digital images (e.g., figures, logos that may be included in a header or footer portion of the contract, and so on), tables (e.g., describing prices, product specifications, etc.), and so forth.

In contrast, the metadata 130 describes various attributes of the agreement 126. Examples of the attributes the metadata 130 describes may include, but are not limited to, a user who is the author of the agreement 126, an organization corresponding to the agreement 126, tags describing topics of the agreement, a list of all questions asked about the agreement, a summarized list of questions asked about the agreement (such that similar questions may be represented by a single representative question), characteristics of signing-party users ("SP users") who asked the questions (e.g., position, organization with which associated, etc.), a change history, a time the agreement 126 was last modified, limitations to modifications of the agreement 126, a list of SP users who have been sent the agreement via the document deployment system 104, an expiration of the agreement 126, a timestamp associated with the agreement 126's creation, and so forth. Indeed, the metadata 130 may describe various attributes of the agreement 126 without departing from the spirit or scope of the described techniques.

When providing information to the agreement comprehension tool 116 to facilitate comprehension of the agreement 126, the comprehension module 120 also interacts with the profiling system 106. In the illustrated example, the profiling system 106 includes profiling module 132 and profile data 134, which is illustrated in storage 136. The profile data 134 is shown having user profile 138 and is illustrated with ellipses to indicate that the storage 136 is capable of maintaining multiple such user profiles 138. Broadly speaking, the user profile 138 includes information about a particular user. In accordance with the described techniques, for instance, the user profile 138 may include information such as the corresponding user's name (e.g., first and last), email address, payment information, demographic information (e.g., age, gender, location, ethnicity, etc.), and so on. Additionally, the user profile 138 includes information to enable the agreement comprehension tool 116 and the comprehension module 120 to facilitate agreement comprehension, such as an organization associated with the user (e.g., an enterprise of which the user is an employee), the user's profession (e.g., sales, marketing, accounting, legal, operations management, etc.), whether the user has interacted with digital "assistants" in similar or other scenarios (e.g., when reviewing previous agreements), questions the user has asked previously during agreement review, representative questions of the questions the user has asked previously during agreement review, data describing actions of the user with various content (e.g., clicks on advertisements and on buttons for providing various functionality), and so forth. As discussed in relation to FIG. 4 below, the information captured in the user profile 138 (e.g., describing agreement interactions) may be used by other service provider systems to improve the digital content and digital experiences those service providers provide to users and organizations.

The profile data 134 is also shown having organization profile 140 and is illustrated with ellipses to indicate that the storage 136 is capable of maintaining multiple such organization profiles 140. Broadly speaking, the organization profile 140 includes information about a particular organization, e.g., a particular company or division of a large enterprise. In accordance with the described techniques, for instance, the organization profile 140 may include information such as the respective organization's number of employees, a number of users of various services, a number and types of roles within the organization, and so forth. Additionally, the organization profile 140 includes information to enable the agreement comprehension tool 116 and the comprehension module 120 to facilitate agreement comprehension, such as identifying users associated with the respective organization. As also discussed in relation to FIG. 4 below, the information captured in the organization profile 140 may be used by other service provider systems to improve the digital content and digital experiences those service providers provide to users and organizations. Additionally or alternately, the information captured in the organization profile 140 can be used to initialize user profiles 138 of users associated with the respective organization. Thus, rather than start with an empty profile, a user associated with an organization having an organization profile 140 may be provided with a user profile 138 having at least some information populated from the organization profile 140.

The comprehension module 120 can collect or otherwise access this information about a particular user from the profiling system 106, identify the information that is relevant to the particular user's current review of the agreement 126, and provide the identified information over the network 112 to the computing device 102 for use by the agreement comprehension tool 116. The agreement comprehension tool 116 then leverages the information about the user and other documents to determine the information to present to the user during review of the agreement 126. By way of example, the agreement comprehension tool 116 uses the limited set of information discussed above and below to determine what information to present in response to the user of the computing device 102 leveraging its voice assistant platform 108 to ask a question about the agreement 126.

Consider an example in which a SP user reviews the agreement 126 via the computing device 102, e.g., by using touch functionality to scroll through the agreement 126 while it is displayed via the computing device 102. When the SP user asks a question about the agreement 126 via a voice assistant platform 108, the comprehension module 120 provides the agreement comprehension tool 116 with a limited set of information related to the agreement 126 and the SP user. In particular, the comprehension module 120 provides the agreement comprehension tool 116 with information about a corpus of documents maintained in the document data 122 by an organization associated with authoring the agreement 126 (the "authoring organization") and information about agreements previously reviewed by the SP user as indicated by the SP user's user profile 138. Additionally or alternately, the comprehension module 120 provides the agreement comprehension tool 116 with information about a corpus of documents corresponding to the SP user's organization. Using this information about the corpus of documents of the authoring organization, the SP user, and the corpus of documents reviewed by the signing-party organization ("SP organization"), the agreement comprehension tool 116 provides a tailored answer to the SP user's question in real time that accounts for knowledge learned from these various sources.

Having considered an example environment, consider now a discussion of some example details of the techniques for a real-time agreement comprehension tool in a digital medium environment in accordance with one or more implementations.

Real-Time Agreement Comprehension Tool

Figure 2:
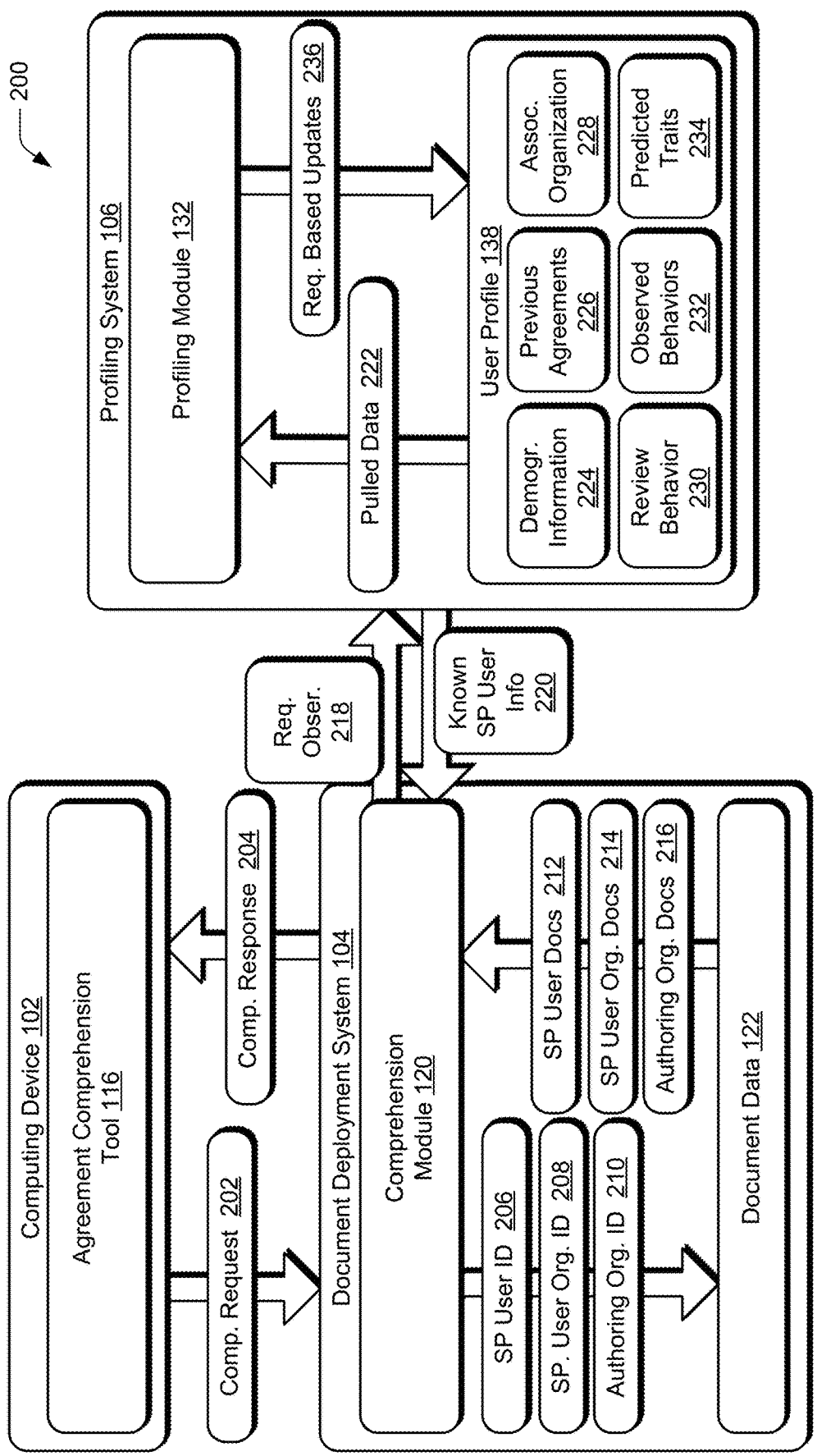
FIG. 2 depicts an example implementation in which the document deployment system of FIG. 1 generates comprehension responses for use by a real-time agreement comprehension tool to expose information that facilitates agreement comprehension.

FIG. 2 depicts an example implementation 200 in which a document deployment system generates comprehension responses for use by a real-time agreement comprehension tool to facilitate agreement comprehension. The illustrated example 200 includes from FIG. 1 the computing device 102, the document deployment system 104, and the profiling system 106 and also includes the agreement comprehension tool 116, the comprehension module 120, the document data 122, the profiling module 132, and the user profile 138.

In this example 200, the computing device 102 is depicted communicating a comprehension request 202 to the document deployment system 104. The comprehension request 202 may be communicated by the computing device 102 based on a variety of actions. For example, the computing device 102 may communicate the comprehension request 202 responsive to the agreement comprehension tool 116 detecting that a user verbally asks a question while reviewing the agreement 126. Alternately or additionally, the computing device 102 may communicate the comprehension request 202 responsive to receiving user input to leverage functionality of the agreement comprehension tool 116, such as a selection of a displayed button to launch the agreement comprehension tool 116. The computing device 102 may also communicate the comprehension request 202 responsive simply to detecting that a user begins interacting with the agreement 126, e.g., responsive to selection of a link to the agreement 126, opening the agreement 126 as an attachment, and so forth.

The comprehension request 202 includes data describing various aspects of interaction with the agreement 126. By way of example, the comprehension request 202 may include data identifying the agreement 126 and a user interacting with the agreement 126, e.g., a user corresponding to a signing party to the agreement 126. Depending on an action that initiates communication of the comprehension request 202, the comprehension request 202 may include data describing other aspects of interaction with the agreement 126.

When the comprehension request 202 is communicated responsive to the user asking a question, for instance, the comprehension request 202 includes data indicative of the asked question, e.g., text of the question generated using speech-to-text capabilities. The comprehension request 202 may also include data describing a portion of the agreement 126 (such as a current portion being presented via a display device), user selections received in relation to the agreement 126, navigation inputs received in relation to the agreement 126, and so forth. The comprehension request 202 may describe a variety of aspects of the user interacting with the agreement 126 and inputs received in connection with the interaction without departing from the spirit or scope of the techniques described herein.

The document deployment system 104 generates the comprehension response 204 in response to the comprehension request 202. The comprehension response 204 includes information that enables the agreement comprehension tool 116 to determine and surface tailored information for facilitating comprehension of the agreement 126, such as via one or more interfaces of the computing device 102 or interfaces communicably coupled to the computing device 102. As discussed above and below, the information included in the comprehension response 204 includes or otherwise describes a corpus of documents corresponding to the authoring organization, agreements previously reviewed by the user (signing-party user or "SP user") that is currently interacting with the agreement 126, and a corpus of documents corresponding to the SP user's organization (e.g., agreements reviewed and/or signed by users that are part of the SP user's organization). This information enables the agreement comprehension tool 116 to deploy one or more natural language processing (NLP) techniques on a limited, but highly relevant set of documents to the agreement 126.

By using this limited, highly relevant set of documents, the agreement comprehension tool 116 is better able to leverage NLP techniques to facilitate comprehension of the agreement 126 than when a large set of generic documents or a set of documents without documents related to the authoring organization, the SP user, or the SP user's organization is leveraged. In this way, the agreement comprehension tool 116 improves comprehension of agreements by parties that are digitally signing the agreements, which facilitates validity and legal enforceability of the agreements. This is because the agreement comprehension tool 116 enables a SP user to ask questions about an agreement while reviewing and have them answered in real time, because the tool surfaces types of information that previously may have been of concern to the SP user, and so forth.

In one or more implementations, the document deployment system 104 may provide users of agreement-authoring organizations with tools to identify one or more documents to add to the limited set, e.g. for processing using the NLP when answering questions. By way of example, the document deployment system 104 may enable the users of agreement-authoring organizations to insert in a given document references to further documentation such that the further documentation is retrieved and processed with the other documents in the limited set. Consider an example in which the agreement 126 is a contract for selling a widget by an authoring organization of the agreement 126. In this example, the document deployment system 104 may allow a user of the authoring organization to associate a first supplemental document with the agreement that describes one or more specifications of the widget. In this first supplemental document, however, the described specifications may be confusing without further information. Here, the document deployment system 104's tools may provide functionality that allows the authoring organization's user to incorporate further supplemental documentation having more detailed specifications of the widget, such as by incorporating the supplemental documentation using the metadata 130 or by using a "footnote" comprising an explicit uniform resource locator (URL) to the supplemental documentation. In this way, the comprehension module 120 and the agreement comprehension tool 116 may be able to process documentation that is referenced by the agreement 126, but not included therein.

In order to generate the comprehension response 204, the document deployment system 104 leverages functionality of the comprehension module 120 and the profiling system 106. In the illustrated example, the comprehension module 120 is depicted providing a SP user identifier 206, a SP user organization identifier 208, and an authoring organization identifier 210 to the document data 122. These identifiers may represent queries made to the storage 124 which contains the document data 122 and enabling return of corresponding data. In this particular example, the document data 122 is shown returning SP user documents 212, SP user organization documents 214, and authoring organization documents 216.

In one or more implementations, the SP user documents 212 represent documents maintained by the document deployment system 104 and previously presented to the SP user. In the discussion above and below, the SP user discussed corresponds to the user profile 138—different users such as other SP users and authoring users correspond to other user profiles 138. The SP user documents 212 include agreements that the SP user previously interacted with (e.g., agreements originating from different authoring organizations) as well as other types of documents maintained by the document deployment system 104 and with which the SP user interacted. As noted below, a list of documents (including agreements) with which the SP user interacted may also be indicated by information included in the user profile 138.

The SP user organization documents 214 represent documents maintained by the document deployment system 104 and associated with an organization corresponding to the SP user. The SP user organization documents 214 may include agreements and other documents with which the SP user's organization has interacted, e.g., agreements authored by other organizations and reviewed for signing by the SP user's organization as well as agreements authored by the SP user's organization. The SP user organization documents 214 may include other documents maintained by the document deployment system 104 on behalf of the SP user's organization. These documents may include "internal" organization documents, such as sales forecasts, budgets, expenditures, inventory documentation, corporate policy, and so forth.

These documents that are identified due to their relationship to SP user's organization—in contrast to documents of authoring organizations—can be leveraged by the comprehension module 120 and the agreement comprehension tool 116 to facilitate comprehension of agreements (e.g., the agreement 126) provided by these other, authoring organizations. By way of example, the agreement comprehension tool 116 can identify terms of the agreement 126 that have caused a portion of an organization (e.g., its legal team) not to sign agreements previously. In this example, a user reviewing the agreement 126 may not be a subject matter expert in relation to the identified terms—the user may not be part of the legal team. Based on the identification, the agreement comprehension tool 116 may surface information to the user related to the identification, such as a notification stating "In the past your organization has not agreed to agreements like this due to the following identified terms." Surfacing notifications like this may be useful to users that are not be aware of terms of an agreement considered relevant by other portions of a same organization.

In contrast, the authoring organization documents 216 represent documents maintained by the document deployment system 104 and associated with an organization serving as an author of the agreement 126. In some cases, one or more users of the authoring organization may have authored the agreement 126. In other cases, however, the agreement 126 may have been largely repurposed by users of the authoring organization and changed slightly, if at all, before being sent by a user of the authoring organization to the SP user. Due to initiating communication of the agreement 126 for signing, the organization responsible for sending the agreement may still be considered an "authoring" organization.

Broadly speaking, the authoring organization documents 216 may include agreements maintained by the document deployment system 104 on behalf of the authoring organization. In one or more implementations, the authoring organization documents 216 may also include documents maintained by the document deployment system 104 regardless of whether the authoring organization has selected to communicate those documents to others. The authoring organization documents 216 can include agreements sent to the SP user, other users of the SP user's organization, and users of other organizations. Like the SP user organization documents 214, the authoring organization documents 216 are not limited to "agreements." Indeed, the authoring organization documents 216 may include various other types of documents that can be leveraged for comprehending portions of the agreement 126. By way of example, these other documents may include sales forecasts of the authoring organization, corporate policy of the authoring organization, interaction handbooks of the authoring organization, document drafting guidelines of the authoring organization, product specifications, and so forth. Certainly, the authoring organization documents 216 may include a variety of documents associated with the authoring organization without departing from the spirit or scope of the described techniques.

Although not depicted, the document deployment system 104 may store in the storage 124, or otherwise have access to, example agreements and documents that serve as templates and/or convey best practices for agreement creation. These example agreements and documents may include content arrangements observed to facilitate comprehension of conveyed concepts when incorporated by an agreement better than other arrangements. These example agreements and documents may also include terms, phrases, and other portions observed to facilitate comprehension of conveyed concepts when incorporated better than other terms and phrases. For instance, these example agreements may include language for forum selection clauses that is observed to facilitate comprehension of an agreed upon choice of forum better than other language.

In addition to document-centric information, the comprehension module 120 also processes user-centric information, e.g., information describing various characteristics of the SP user. To this end, the illustrated example 200 includes request observations 218 and known SP user information 220. Generally speaking, the request observations 218 describe user behaviors corresponding to the comprehension request 202. Examples of such behaviors include whether the SP user actively selected to launch the agreement comprehension tool 116, questions asked by the SP user, other inputs received from the SP user, and so forth. These described behaviors can be used to update the SP user's user profile 138 so that the user profile 138 includes information which accurately describes how the SP user interacts with agreements.

In contrast, the known SP user information 220 represents information maintained as part of the user profile 138 and which the profiling module 132 determines is related to the comprehension request 202, such as based on subject matter of the agreement 126, a question asked by the SP user to initiate the comprehension request 202, and so forth. The known SP user information 220 corresponds to at least a portion of information pulled by the profiling module 132 from the user profile 138 based on the comprehension request 202. This portion of information pulled from the user profile 138 is represented in the illustrated example 200 as pulled data 222. In one or more implementations, the request observations 218 include the SP user identifier 206, enabling the profiling module 132 to locate the user profile 138 of the SP user.

In the illustrated example 200, the user profile 138 is illustrated including demographic information 224, previous agreements 226, associated organization 228, review behavior 230, observed behaviors 232, and predicted traits 234. Each of these represents one or more characteristics and/or behaviors captured in data for a user that corresponds to the user profile 138, such as the SP user. Certainly, the user profile 138 may describe more, fewer, or different characteristics of users without departing from the spirit or scope of the described techniques.

In general, the demographic information 224 describes demographics of the user such as name, age, gender, and location. The demographic information 224 may describe other characteristics of the user as well, such as email address, associated devices, payment information, preferences for communication, and so forth. The previous agreements 226 data describes agreements with which the user profile 138's corresponding user previously interacted. By way of example, the previous agreements 226 include agreements propagated to the user for signing via the document deployment system 104. In one or more implementations, the previous agreements 226 may be configured as a list of identifiers of these agreements, where the identifiers enable the comprehension module 120 to retrieve the agreements from the document data 122. Although not shown, the user profile 138's data may have similar data representing other documents maintained by the document deployment system 104 with which the user profile 138's corresponding user previously interacted. Examples of such other documents are enumerated above.

The associated organization 228 describes one or more organizations of a respective user corresponding to the user profile 138, such as an enterprise by which the respective user is employed. In one or more implementations, the profiling system 106 communicates the associated organization 228 information to the comprehension module 120 based on the comprehension request 202. In such implementations, the associated organization 228 information may include the SP user organization identifier 208, which allows the comprehension module 120 to retrieve the SP user organization documents 214 from the document data 122.

The review behavior 230 describes interactions of the SP user with agreements. By way of example, the review behavior 230 describes questions asked in relation to these agreements, user navigation inputs received in relation to these agreements (e.g., scrolling inputs, zooming inputs, pauses in navigation inputs which may be indicative of more time spent on a portion of an agreement, etc.), agreement drafts signed, agreement drafts not signed, agreements returned to an authoring organization with changes from the SP user, and so forth.

The observed behaviors 232 describe interactions of the SP user with additional content—not interactions with agreements maintained by the document deployment system 104. For instance, the observed behaviors 232 may describe interactions of the SP user with other types of documents maintained by the document deployment system 104 and also interactions with surfaced advertisements (e.g., banner advertisements), an amount of time with which the SP user interacts with a document or other digital content, which portions of the document (e.g., pages, sections, etc.) or digital content with which the SP user interacts, a number of times the SP user views a document or digital content, whether the SP user shared the document or digital content in some way, types of questions asked in relation to a document or digital content, devices on which a document or digital content is viewed, purchases completed by the SP user, whether the SP user has selected to interact with a digital assistant previously, whether the SP user has interacted with a voice assistant platform previously, and so forth.

Consider an example in which the observed behaviors 232 describe that the SP user has not interacted with a digital assistant previously. In this example, the comprehension module 120, in concert with the agreement comprehension tool 116, may determine not to automatically surface comprehension information via the SP user's computing device 102. This is because a lack of previous interactions with digital assistants may indicate that the SP user is not comfortable interacting with them. In this case, the comprehension module 120 and the agreement comprehension tool 116 may instead wait to surface comprehension information via the SP user's computing device 102 until an explicit selection is received of an option to launch the agreement comprehension tool 116. In contrast, the comprehension module 120 and the agreement comprehension tool 116 may interact to surface comprehension information automatically—without explicit user input initiating deployment of the tool—in scenarios where the observed behaviors 232 describe that the SP user has interacted with a digital assistant previously. This is because previous interactions with digital assistants may indicate that the SP user is comfortable interacting with them.

The predicted traits 234 describe characteristics of users that may be inferred from explicit actions described by other data of the user profile 138. By way of example, the observed behaviors 232 may describe that a user has clicked on several advertisements for voice assistant devices and has even added them to a shopping cart of an online store. Given this, the profiling module 132 may infer that the user is likely to engage with a digital assistant and/or is comfortable doing so. As such, the profiling module 132 generates data describing that the user is likely to engage with a digital assistant and maintains this data in the predicted traits 234. Consequently, even if the user has not previously interacted with a digital assistant, the comprehension module 120 and the agreement comprehension tool 116 may interact to surface comprehension information automatically—without explicit user input initiating deployment of the agreement comprehension tool 116. Certainly this is just one example of a characteristic that may be inferred by the profiling module 132 based on other behaviors taken by the respective user of the user profile 138. Other examples of the characteristics that may be inferred and described by the predicted traits 234 include a likelihood to abandon an agreement or document before signing (e.g., by exiting a signing application or interface), a likelihood to sign on which of a plurality of devices, a likelihood of churn based on pages of a document viewed, and so forth. It is to be appreciated that a variety of other characteristics may be captured in the predicted traits 234 without departing from the spirit or scope of the described techniques.

The illustrated example 200 also includes request based updates 236. These correspond to updates that the profiling module 132 makes to the data of the user profile 138 in connection with the comprehension request 202, such as to update the previous agreements 226 to include an identifier of the agreement 126 when it is presented to the user in connection with the comprehension request 202.

Figure 3:
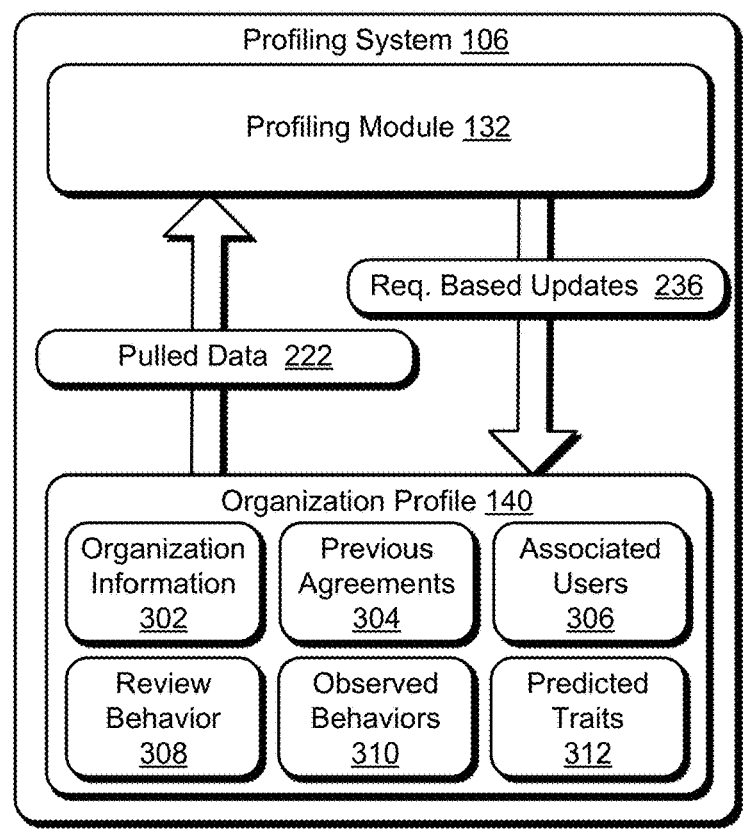
FIG. 3 depicts an example implementation depicting the organization profile of FIG. 1 in greater detail.

FIG. 3 depicts an example 300 depicting the organization profile of FIG. 1 in greater detail. The illustrated example 300 includes the profiling system 106 having the profiling module 132 and the organization profile 140.

The illustrated example also includes from FIG. 2, the pulled data 222 and the request based updates 236. This represents that the profiling module 132—in addition to pulling data from the user profile 138—also includes functionality to pull data from the organization profile 140 based on the comprehension request 202. In addition, this represents that the profiling module 132 updates the data of the organization profile 140 in connection with the comprehension request 202. Additionally or alternately, the profiling module 132 may update the organization profile 140 and the user profile 138 based on other interactions, such as interactions of a corresponding organization's users with content from channels other than the document deployment system 104, e.g., digital content surfaced by other service providers.

In the illustrated example 300, the organization profile 140 is illustrated having organization information 302, previous agreements 304, associated users 306, review behavior 308, observed behaviors 310, and predicted traits 312. In a similar fashion to the user profile 138, the organization profile 140 may describe more, fewer, or different characteristics of a corresponding organization without departing from the spirit or scope of the described techniques.

In general, the organization information 302 describes characteristics of the corresponding organization, such as a number of employees (e.g., when the organization employs people), a number of users of one or more services (e.g., software platforms), a number and type of roles within the organization (e.g., administrator, limited editing capability, read only, etc.), industries of the organization, location information, organization website, and so forth. The previous agreements 304 data may describe agreements with which users associated with the respective organization previously interacted. The previous agreements 304 data may be configured in a similar manner to the previous agreements 226 data discussed in relation to FIG. 2, but for multiple users of the respective organization rather than simply for the respective user corresponding to a single user profile 138.

The associated users 306 data describes one or more users of a respective organization that corresponds to the organization profile 140, such as users set up with accounts (and thus corresponding user profiles 138) by an administrative user of the respective organization. The associated users 306 data may thus correspond to a list of users associated with the respective organization, e.g., it may comprise a list of user identifiers. The review behavior 308 describes interactions of the associated users 306 with agreements. The review behavior 308 may be configured in a similar manner as the review behavior 230, but for the multiple users of the respective organization. In one or more implementations, the review behavior 308 data may describe substantially each interaction of each of the associated users 306 with agreements, e.g., questions asked by the associated users 306 in relation to agreements. Additionally or alternately, the review behavior 308 may describe a sample (not each interaction), or otherwise represent, the interactions of the associated users 306 with agreements. Further still, the review behavior 308 may reference (e.g., with pointers) the review behavior 230 from the user profiles 138 of the respective organization's users.

The observed behaviors 310 describe interactions of the associated users 306 with additional content—not interactions with agreements maintained by the document deployment system 104. The observed behaviors 310 may be configured in a similar manner as the observed behaviors 232, but for the multiple users of the respective organization. The observed behaviors 232 may describe each interaction of the associated users 306 with the additional content, a representation (e.g., a sample) of the interactions of the associated users 306 with the additional content, and/or reference the observed behaviors 232 of the respective organization's users.

The predicted traits 312 describe characteristics of the organization that may be inferred from explicit actions or characteristics described by other data in the organization profile 140. In one or more implementations, the predicted traits 312 describe characteristics that can be inferred about the respective organization across its associated users 306, such as a percentage of the organization's users that will perform some action, whether a majority of the organization's users will perform some action (e.g., to enable a proposal to "pass"), whether the organization has a reputation for being price conscious, whether the organization is price conscious in relation to services, whether the organization is price conscious in relation to products, whether the organization is price conscious in relation to various features of products and services, focused on markets in the United States rather than other emerging markets, takes longer than some amount of time (e.g., a threshold, identified average, etc.) to sign agreements, and so forth. The predicted traits may describe different characteristics that may be inferred by the profiling module 132 (e.g., using machine learning such as a regression model) without departing from the spirit or scope of the described techniques.

Although the information maintained in the user profile 138 and the organization profile 140 is used in connection with surfacing information for real-time agreement comprehension, this information may also be leveraged in connection with delivering digital content and experiences via other channels. For instance, the behavior of a user to interact with a digital assistant (e.g., the agreement comprehension tool 116) when reviewing an agreement and questions asked by a user when leveraging the digital assistant can be useful for determining content or experiences to serve a user via other channels, e.g., via email campaigns, mobile or desktop apps, newsletters, websites, and so forth. In this context, consider FIG. 4.

Figure 4:
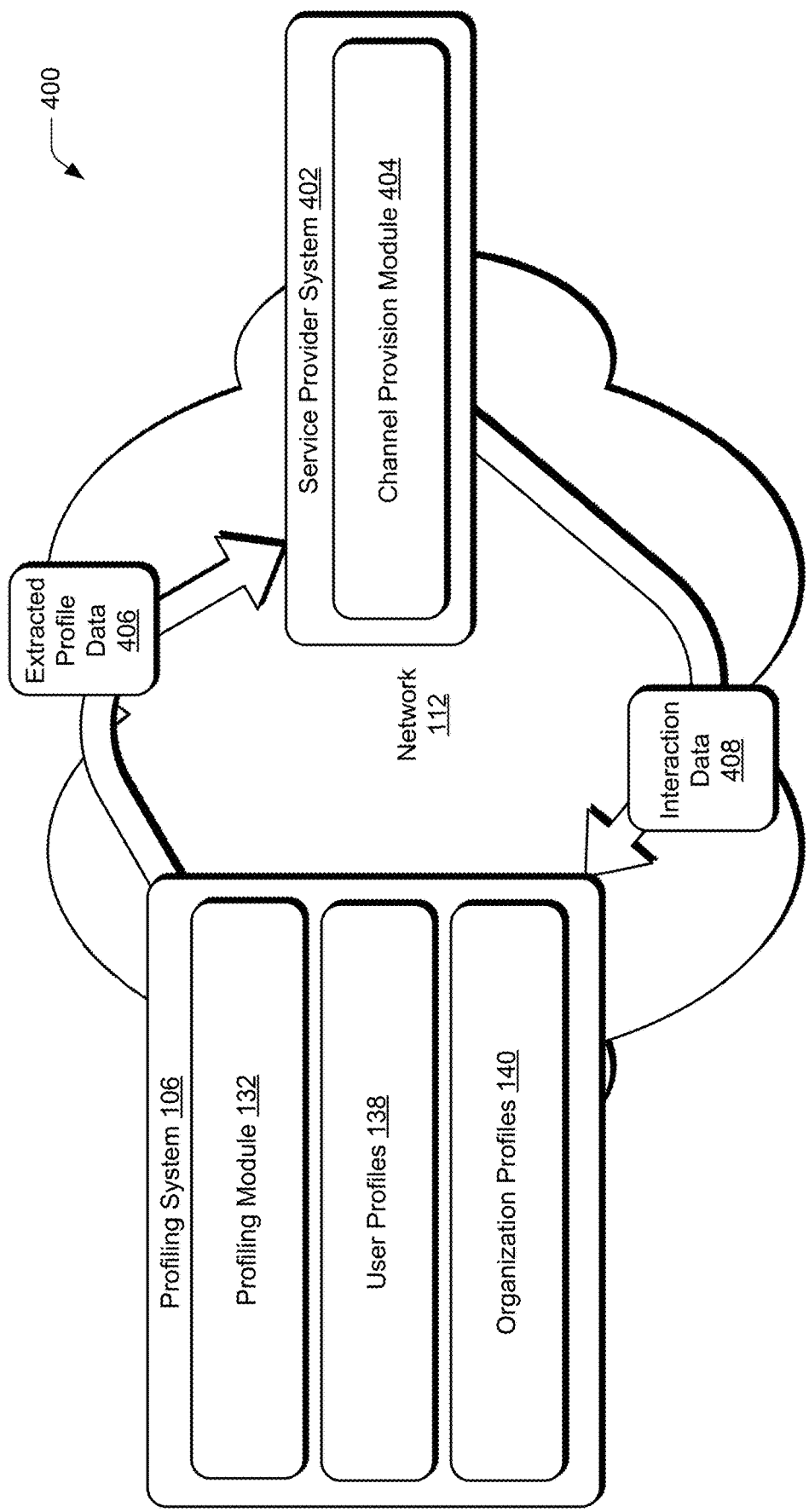
FIG. 4 depicts an example implementation in which the profiling system provides user and/or organization profile data describing interactions with agreements and the agreement comprehension tool to a service provider system.

FIG. 4 depicts an example 400 of an implementation in which the profiling system provides user and/or organization profile data describing interactions with agreements and the agreement comprehension tool to a service provider system.

The illustrated example 400 includes the profiling system 106 having the profiling module 132, the user profile 138, and the organization profile 140. Additionally, the illustrated example 400 includes service provider system 402 having channel provision module 404. The service provider system 402 represents one or more devices communicably coupled to provide one or more services to clients, in part by leveraging communications over the network 112. By way of example, services include email services, news services, online shopping services, content streaming services, content repository services, and so forth.

The channel provision module 404 represents functionality of the service provider system 402 to provide one or more channels of digital content or digital experiences to computing devices through communications via the network 112. By way of example, channels of digital content or experiences may include email campaigns, exposure of content via mobile or desktop apps, electronic newsletters, web pages or components of web pages (e.g., banner advertisements), and so forth. The channel provision module 404 may serve different content without departing from the spirit or scope of the described techniques.

In accordance with the described techniques, the channel provision module 404 customizes the digital content that it serves based on characteristics of a user or users to which the content is being served. By way of example, the channel provision module 404 may configure newsletters differently on a per-user basis and then send the differently configured newsletters based on the characteristics of the intended recipient. Moreover, the channel provision module 404 may use characteristics related to user review of agreements and other documents and organization review of agreements and other documents (e.g., using the agreement comprehension tool 116) to determine how to configure the digital content to be served.

To this end, the illustrated example 400 includes extracted profile data 406. The extracted profile data 406 represents data extracted from the user profiles 138 and the organization profiles 140 by the profiling system 106. The profiling module 132 also communicates the extracted profile data 406 to the service provider system 402, e.g., over the network 112. In this way, the channel provision module 404 may use data describing behaviors of users and organizations with agreements and other documents to improve (e.g., by customizing) channels of content delivered to such users and organizations.

By way of example, assume that the extracted profile data 406 describes that a particular user corresponding to a user profile 138 interacts with the agreement comprehension tool 116 to answer questions about agreements. In this example, the service provider system 402 may provide a mobile application that includes one or more digital assistants. Based on the example extracted profile data 406, the channel provision module 404 may determine to surface the service provider system 402's digital assistant functionality to the user that interacts with the agreement comprehension tool 116, e.g., because the user has demonstrated that he or she is comfortable interacting with digital assistants. The extracted profile data 406—describing interactions with agreements and the agreement comprehension tool—may be leveraged in a variety of ways by the channel provision module 404 to determine what digital content to deliver to users and thus further improve the customization level of the delivered content.

The illustrated example 408 also includes interaction data 408. The interaction data 408 represents interactions that the channel provision module 404 tracks and records in relation to the digital content that it serves. If the channel provision module 404 delivers an email campaign, for instance, the channel provision module 404 can track interaction of users with the emails, such as whether the users opened the emails, clicked on portions of the emails, an amount of time the emails were viewed, whether the emails were simply deleted, and so forth. The channel provision module 404 can also record these interactions in data and communicate the data or portions of the data to the profiling system 106 as the interaction data 408. It is to be appreciated that the interaction data 408 can be leveraged to describe various interactions without departing from the spirit or scope of the described techniques. In one or more implementations, the profiling system 106 uses the interaction data 408 to generate the observed behaviors 232 data of the user profile 138 and the observed behaviors 310 data of the organization profile 140. Returning now to a discussion of surfacing information to facilitate agreement comprehension in accordance with the described techniques. In this context, consider FIG. 5.

Figure 5:
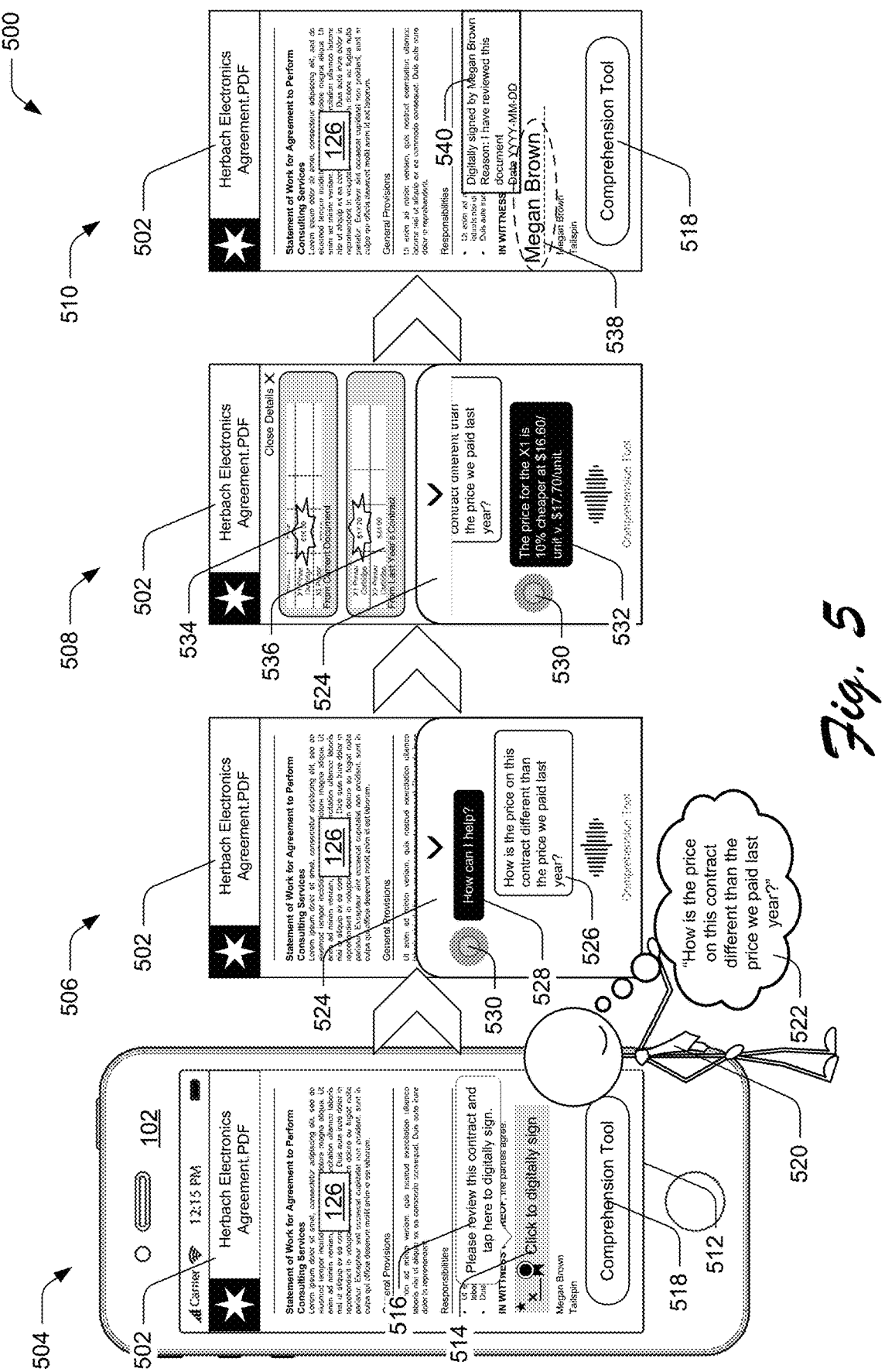
FIG. 5 depicts an example of a scenario in which a user interface enables interaction with the agreement comprehension tool to facilitate comprehension of an agreement in real time.

FIG. 5 depicts an example 500 of a scenario in which a user interface enables interaction with the agreement comprehension tool to facilitate comprehension of an agreement in real time.

In particular, the example 500 depicts user interface 502 at four different stages, including first stage 504, second stage 506, third stage 508, and fourth stage 510. At the first stage 504, the user interface 502 is depicted being displayed via a display device 512 of the computing device 102. It is to be appreciated that at the other stages, the user interface 502 is also displayed via the display device 512; however, the display device 512 and the computing device 102 are not depicted at these other stages for the sake of clarity.

The first stage 504 represents a portion of the scenario in which the agreement 126 is presented via the user interface 502 and in which the agreement comprehension tool 116 is not yet invoked to facilitate comprehension of the agreement 126. In addition to the agreement 126, the user interface 502 is depicted presenting a signing instrumentality 514, reviewing instructions 516, and graphical tool-invocation instrumentality 518. The signing instrumentality 514 represents functionality to enable user 520 to digitally sign the agreement 126, e.g., to legally bind the user 520 and/or an organization which the user 520 is capable of binding as an agent. Given this, the user 520 corresponds to a signing party to the agreement, and thus also corresponds to the SP user discussed in various examples herein.

In the illustrated example 500, the user 520 is depicted providing a verbal query 522, which is one example of an input that may initiate a comprehension request 202. In this example 500, receipt of the verbal query 522 by the computing device 102 (e.g., via one of its microphones) is effective to invoke the agreement comprehension tool 116. Certainly, the agreement comprehension tool 116 may alternately or additionally be invoked responsive to receiving selection of the graphical tool-invocation instrumentality 518. For instance, the user interface 502 may include functionality that allows the user 520 to type a query instead, without speaking the verbal query 522. Indeed, the agreement comprehension tool 116 is configured to provide answers to non-spoken queries as well as spoken ones without departing from the spirit or scope of the described techniques.

The second stage 506 represents a subsequent portion of the scenario in which the agreement comprehension tool 116 is invoked. At the second stage 506, the user interface 502 includes comprehension tool portion 524. In this example, the comprehension tool portion 524 is configured according to a chat-based arrangement. It is to be appreciated that the comprehension tool portion 524 may be configured in various other ways without departing from the spirit or scope of the described techniques, such as without a visual text record of a conversation. Nevertheless, in this example, the comprehension tool portion 524 of the user interface 502 includes an indication 526 of the verbal query 522. Here, the indication 526 is text corresponding to the verbal query 522, which the agreement comprehension tool 116 may generate using one or more speech-to-text techniques.

The comprehension tool portion 524 is also depicted with prompt 528 and tool representation 530, which may be used as visual indications indicative of information provided by the agreement comprehension tool 116. For instance, the tool representation 530 may be animated (e.g., pulse, glow, change color, etc.) as the agreement comprehension tool 116 outputs prompts (e.g., the illustrated prompt 528) and query answers via the comprehension tool portion 524. Additionally or alternately, the agreement comprehension tool 116 may cause speech indicative of query answers to be audibly output, such as via one or more speakers of the computing device 102. In these scenarios, the tool representation 530 may be animated in various manners as noted above. In the context of outputting an answer to a query, consider the third stage 508.

At the third stage 508, the comprehension tool portion 524 includes query answer 532. It is to be appreciated that the agreement comprehension tool 116 generates and displays the user interface 502 configured as at the third stage 508 responsive to the user 520's verbal query 522 in real time. This occurs after the verbal query 522 is converted to text and presented as at the second stage 506. By determining an answer to the verbal query 522 and presenting the query answer 532, the agreement comprehension tool 116 facilitates comprehension of the agreement 126—the tool helps the user 520 understand portions of the agreement 126 about which he or she has questions. In addition to displaying the query answer 532, the agreement comprehension tool 116 may audibly output speech corresponding to the query answer 532.

In accordance with the described techniques, the agreement comprehension tool 116 determines the answer to the verbal query 522 by leveraging NLP techniques and other machine learning relative to a limited set of information provided to the tool by the comprehension module 120, namely, information selected from, or entireties of, a corpus of documents corresponding to the agreement 126's authoring organization, agreements with which the user 520 previously interacted, and a corpus of documents of an organization (if any) corresponding to the user 520.

In addition to the comprehension tool portion 524, at the third stage 508, the user interface 502 is also depicted presenting excerpts 534, 536 to facilitate comprehension of the agreement 126. The excerpt 534 represents a portion of the agreement 126 identified by the agreement comprehension tool 116 as being pertinent to the user 520's verbal query 522. In accordance with the described techniques, the agreement comprehension tool 116 may identify this excerpt 534 from the agreement 126 using NLP. In contrast, the excerpt 536 represents a portion of a previous agreement (e.g., "Last Year's Contract"). The agreement comprehension tool 116 may identify this excerpt 534 from documents provided to the agreement comprehension tool 116 by the comprehension module 120, such as from the SP user documents 212 (as an agreement previously interacted with by the user 520), from the authoring organization documents 216 (as a document corresponding to the authoring organization of the agreement 126), or from a combination of these. Regardless, identifying these pertinent excerpts 534, 536 and presenting them via the user interface 502 supports the query answer 532. In other words, the excerpts 534, 536 are context for the query answer 532 or visual proof of the accuracy of the query answer 532 provided by the agreement comprehension tool 116. Such context or visual proof may help users trust the answers provided by the agreement comprehension tool 116.

The fourth stage 510 represents a portion of the example scenario 500 in which the user 520 has digitally signed the agreement 126. This is represented in the illustration with digital signature 538 and signature information block 540, which includes a variety of information related to the digital signature 538. It is to be appreciated that by facilitating comprehension of the agreement 126, the agreement comprehension tool 116 encourages the user 520 to sign the agreement 126 and causes the user to have less apprehension about signing the agreement 126. This is because the user 520's questions about the agreement 126 have been answered in real time, causing the user 520 to better understand the agreement 126 to which he or she digitally attaches a signature. Users may digitally sign agreements, relative to which the agreement comprehension tool 116 surfaces information to facilitate comprehension, in a variety of manners without departing from the spirit or scope of the described techniques.

Figure 6:
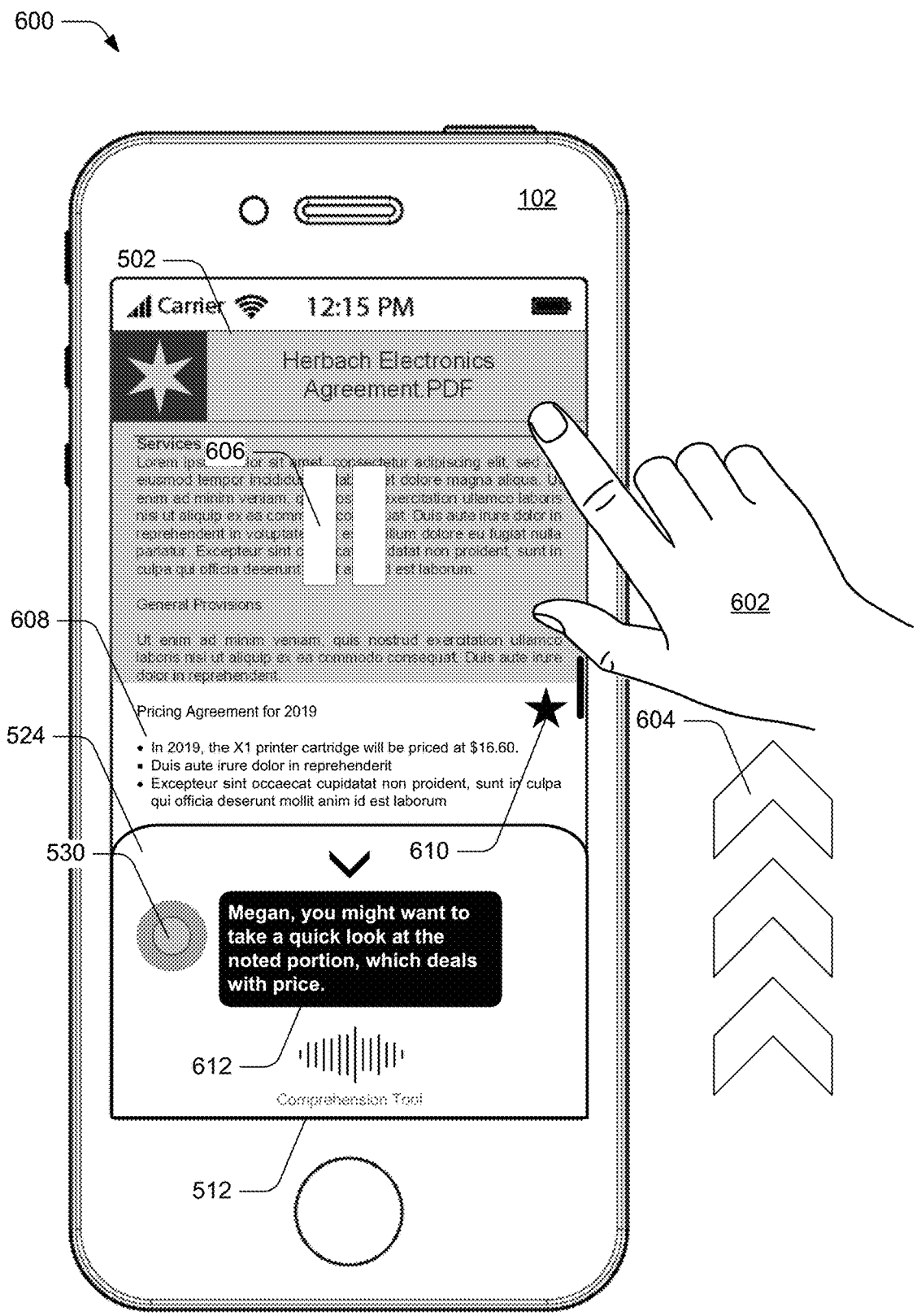
FIG. 6 depicts another example of a user interface in which the real-time agreement comprehension tool automatically restricts user navigation functionality to facilitate agreement comprehension.

FIG. 6 depicts another example 600 of a user interface in which the real-time agreement comprehension tool automatically restricts user navigation functionality to facilitate agreement comprehension.

The illustrated example 600 includes the computing device 102, which is depicted outputting the user interface 502 via the display device 512. In this example 600, the user interface 502 is depicted presenting the agreement 126 and the comprehension tool portion 524. A hand 602 of a user (e.g., the user 520) is also depicted interacting with the display device 512, such as to provide navigation inputs recognized by touch functionality of the display device 512. Arrows 604 represent that the hand 602 makes one or more upward swiping motions in relation to the display device 512. When detected, these upward swiping motions may be effective to scroll through the agreement 126.

In practice, users may often attempt to quickly scroll through digital agreements to navigate to one or more portions, such as portions they are interested in reviewing or simply to an end of an agreement so they can digitally sign the agreement. In one or more implementations, the agreement comprehension tool 116 restricts such navigation inputs, e.g., to stop scrolling of the agreement at least temporarily. The stopped scrolling is represented in the illustrated example by pause symbol 606, which may or may not be displayed via the user interface 502 in various implementations. The agreement comprehension tool 116 may temporarily restrict navigation inputs to emphasize portion 608 of the agreement 126 based on a variety of triggers. By way of example, these triggers may include observed interest by the user in similar types of information in connection with previous agreements (as indicated by the data included in the user profile 138), a determined responsibility of the user to review similar types of information (e.g., due to the user's position in an organization as described by the data of the user profile 138), an identified issue with an ability to bind a signing party to the agreement 126 due to comprehension of the portion 608, and so forth.

In the illustrated example 600, the agreement comprehension tool 116 visually emphasizes portion 608 in relation to other portions of the agreement by displaying it in a different color, e.g., white instead of grey. The illustrated example 600 also includes emphasized indicator 610. It is to be appreciated that the agreement comprehension tool 116 may emphasize portions of the agreement 126 relative to which navigation inputs are restricted in a variety of ways without departing from the spirit or scope of the described techniques. In this example, the comprehension tool portion 524 also includes the tool representation 530 and alert 612, which notifies a user regarding why the navigation inputs are currently restricted.

Figure 7:
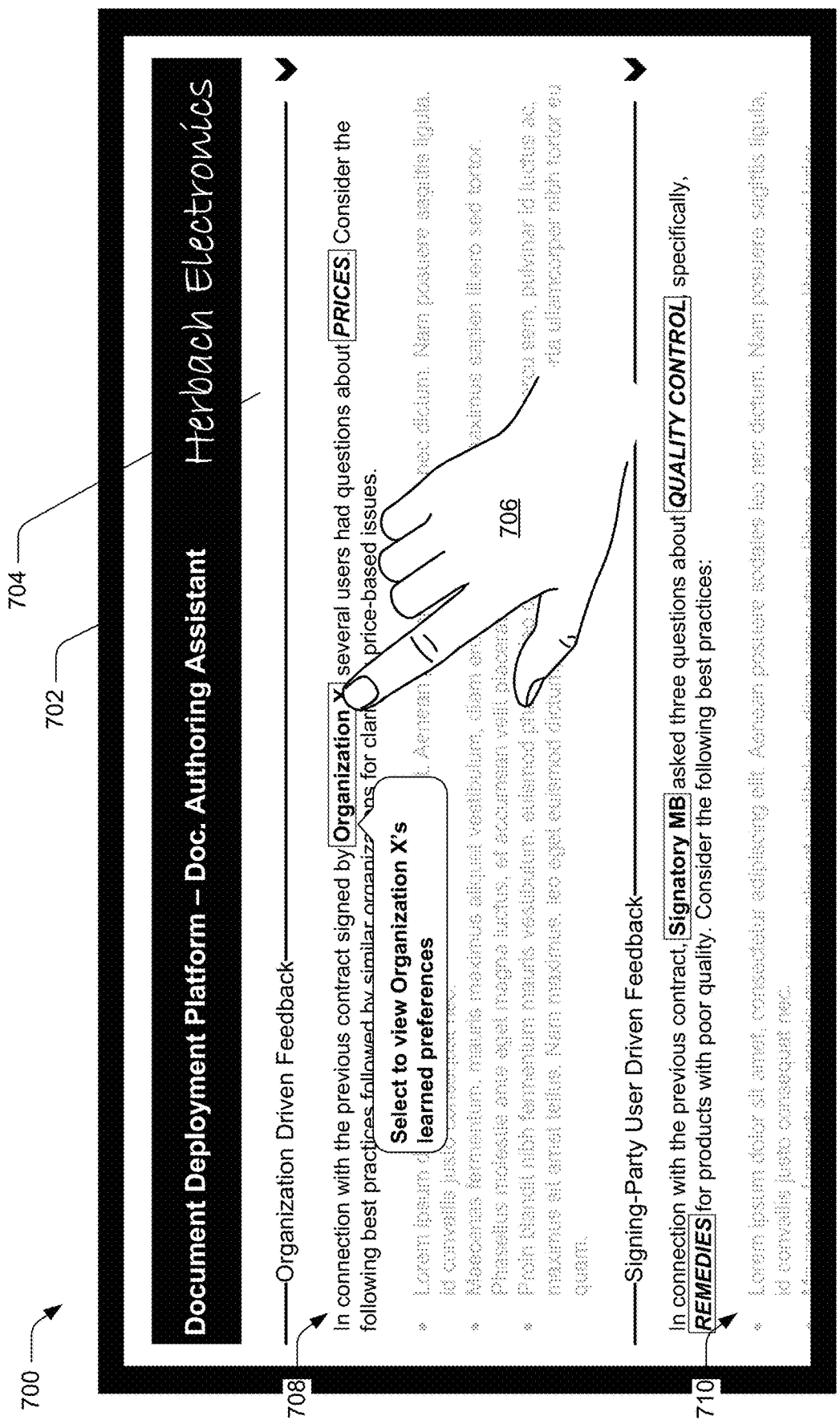
FIG. 7 depicts an example of a user interface in which feedback is provided for authoring agreements.

FIG. 7 depicts an example 700 of a user interface in which feedback is provided for authoring agreements.

In particular, the illustrated example 700 includes display device 702 displaying user interface 704. The illustrated example 700 also includes a hand 706 interacting with the display device 702, such as by using touch functionality of the display device 702 or touchless gesture recognition.

Broadly speaking, the user interface 704 presents information to an authoring user of an agreement, such as the agreement 126. In one or more implementations, the document deployment system 104 includes functionality to generate such user interfaces to provide feedback to authoring users and organizations that author agreements maintained by the document deployment system 104. The document deployment system 104 determines this feedback based on interactions of individual signing users and based on interactions observed across organizations in relation to agreements, such as whether multiple users of an organization perform a similar interaction in relation to a particular agreement (e.g., they ask similar questions). The tracking of these interactions at an individual user level and the ability to associate the individual users with a respective organization, allows the comprehension module 120 to organize feedback on a per-user level and a per-organization level.

To this end, the user interface 704 is depicted with organization-centric feedback portion 708. The comprehension module 120 includes this portion in the user interface 704 to help an authoring user author or deploy agreements for the respective organization. The user interface 704 is also depicted with signing-party user-centric feedback portion 710. The comprehension module 120 includes this portion in the user interface 704 to help the authoring user author or deploy agreements for the particular signing-party user. This feedback may enable the authoring user to create agreements that are more easily comprehended by users of the respective organization as well as by the particular signing-party user.

Having discussed example details of the techniques for a real-time agreement comprehension tool, consider now some example procedures to illustrate additional aspects of the techniques.

Example Procedures

This section describes example procedures for a real-time agreement comprehension tool in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the computing device 102 of FIG. 1 that makes use of the agreement comprehension tool 116 and the document deployment system 104 that makes use of the comprehension module 120 and the profiling system 106.

Figure 8:
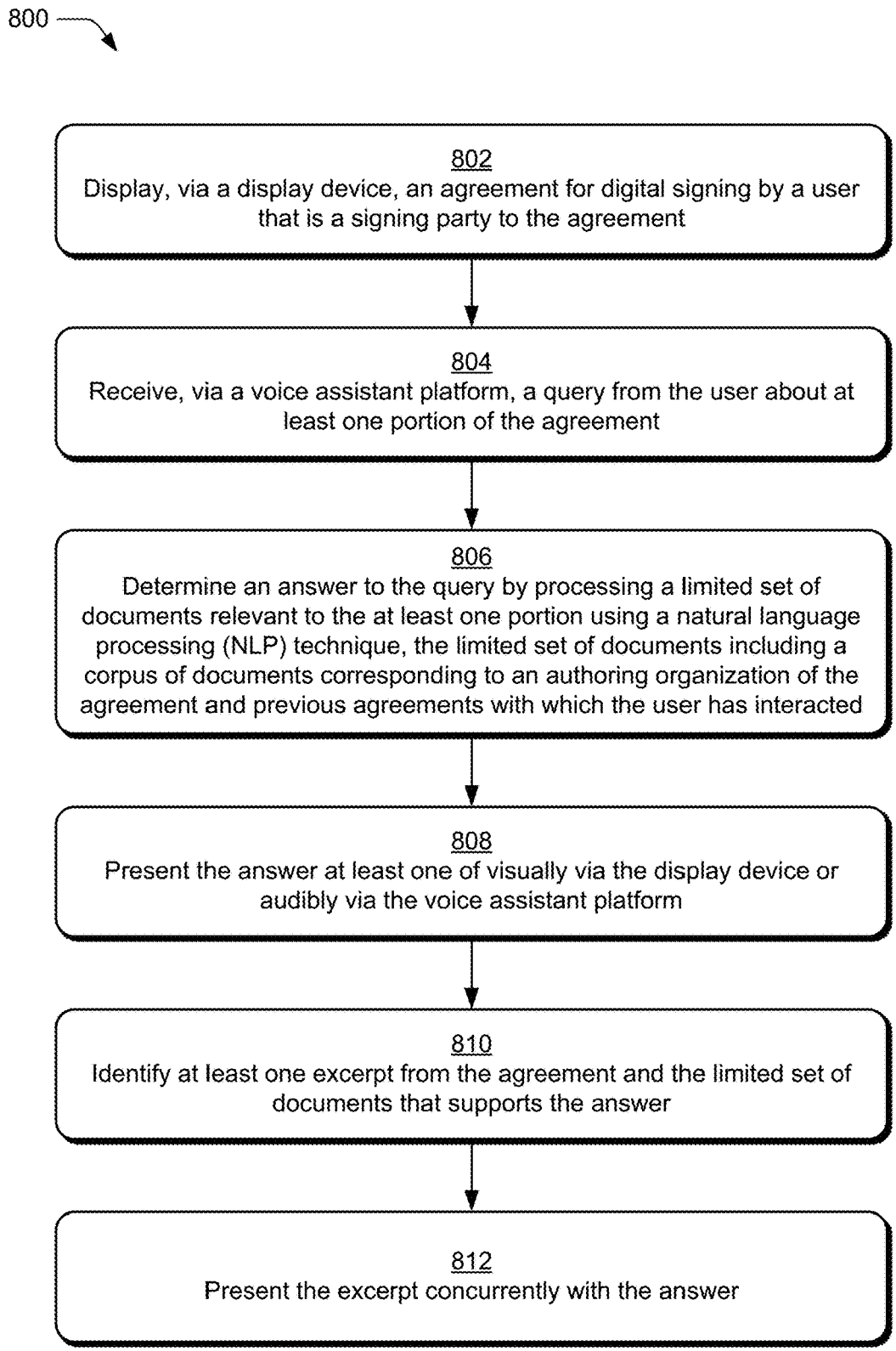
FIG. 8 depicts a procedure in an example implementation in which a query that is about an agreement surfaced for digital signing is answered in real time.

FIG. 8 depicts a procedure 800 in an example implementation in which a query that is surfaced about an agreement for digital signing is answered in real time.

An agreement is displayed via a display device for digital signing by a user that is a signing party to the agreement (block 802). By way of example, the agreement comprehension tool 116 causes the agreement 126 to be displayed via the display device 512 of the computing device 102 for digital signing by the user 520. Here, the user 520 is a signing party to the agreement 126. Further, the computing device 102 has received the agreement 126 from the document deployment system 104 via the network 112 and responsive to a request from a user of an authoring organization to propagate the agreement to the user 520 for digital signing.

A query is received via a voice assistant platform from the user about at least one portion of the agreement (block 804).

By way of example, the agreement comprehension tool 116 receives data indicative of the verbal query 522 via a voice assistant platform 108 incorporated with the computing device 102. In one or more implementations, the voice assistant platform 108 communicates the data indicative of the verbal query 522 to the agreement comprehension tool 116 by leveraging functionality of an application programming interface (API). Broadly speaking, the API serves as an interface that enables data to be passed between the voice assistant platform 108 and the agreement comprehension tool 116 as well as the comprehension module 120.

An answer to the query is determined by processing a limited set of documents relevant to the at least one portion of the agreement using a natural language processing (NLP) technique (block 806). In accordance with the principles discussed herein, the limited set of documents includes a corpus of documents corresponding to an authoring organization of the agreement and previous agreements with which the user has interacted. By way of example, the agreement comprehension tool 116 determines the query answer 532 by processing a set of documents that are relevant to a portion of the agreement 126 using one or more NLP techniques. This set of documents is limited to a corpus of documents corresponding to an authoring organization of the agreement 126 (e.g., the authoring organization documents 216) and the previous agreements with which the user 520 has interacted (e.g., the SP user documents 212). In one or more implementations, this limited set of documents also includes a corpus of documents corresponding to an organization of the user 520, e.g., the SP user organization documents 214. By using this limited, highly relevant set of documents, the agreement comprehension tool 116 is better able to leverage NLP techniques to facilitate comprehension of the agreement 126 than when a large set of generic documents is leveraged.

The answer is presented via at least one of visually via the display device or audibly via the voice assistant platform (block 808). By way of example, the agreement comprehension tool 116 causes the query answer 532 to be presented. For instance, the agreement comprehension tool 116 causes the query answer 532 to be visually presented by displaying it via the display device 512 of the computing device 102. Additionally or alternately, the agreement comprehension tool 116 causes the query answer 532 to be presented audibly by outputting it via one or more speakers communicably coupled to the computing device 102, such as via one of the voice assistant devices 110.

At least one excerpt from the agreement and the limited set of documents is identified that supports the answer (block 810). By way of example, the agreement comprehension tool 116 identifies at least one of the excerpts 534, 536 that supports the query answer 532 from the above-noted limited set of documents relevant to the at least one portion of the agreement 126.

The excerpt is presented concurrently with the answer (block 812). By way of example, the agreement comprehension tool 116 causes one or more of the excerpts 534, 536 to be displayed via the display device 512 of the computing device 102. The agreement comprehension tool 116 may present excerpts that support an answer to a query about an agreement in a variety of other ways without departing from the spirit or scope of the described techniques. In one or more implementations, the excerpt may not be presented automatically. In such implementations, the agreement comprehension tool 116 may instead provide an instrumentality that enables a user to request excerpts, e.g., to provide context or visual proof to support the query answer 532. By way of example, the agreement comprehension tool 116 may display a "Learn More" button or prompt when the query answer 532 is presented. The presented button or prompt may be selected (e.g., with touch input to a touch enabled surface) or by speaking (e.g., by saying "I want to learn more"). In other implementations, the agreement comprehension tool 116 may not present excerpts that provide context for or visual proof to support the query answer 532.

Figure 9:
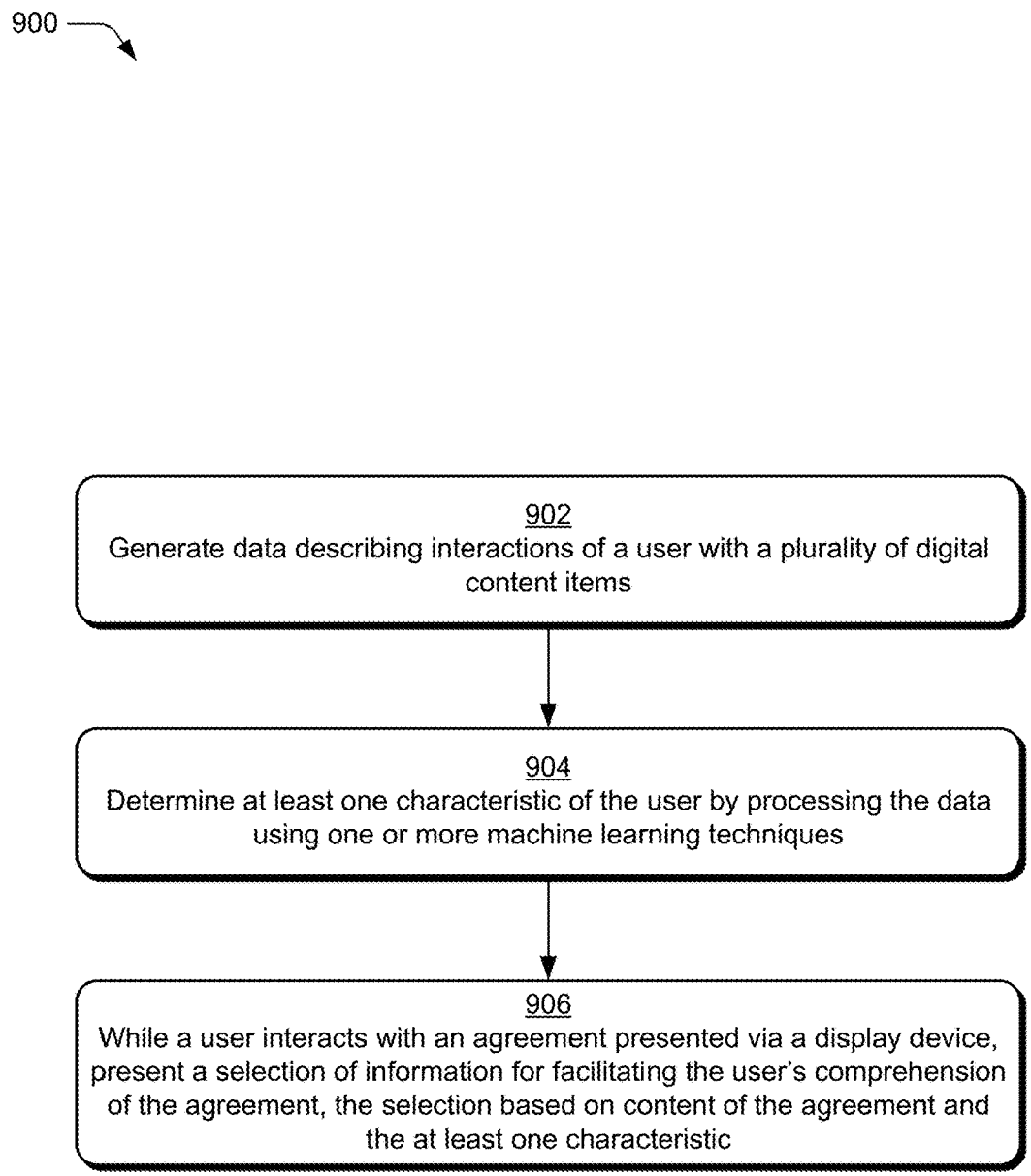
FIG. 9 depicts a procedure in an example implementation in which a selection of information is presented to facilitate a user's comprehension of an agreement.

FIG. 9 depicts a procedure 900 in an example implementation in which a selection of information is presented to facilitate a user's comprehension of an agreement.

Data describing interactions of the user with a plurality of digital content items is generated (block 902). By way of example, the profiling module 132 generates the review behavior 230 data and the observed behaviors 232 data, which describe interactions of a respective user of the user profile 138 with previous agreements and with other types of digital content (e.g., presented digital advertising), respectively. In one or more implementations, the profiling module 132 generates this data based, in part, on communications about user behavior received from the agreement comprehension tool 116 and the comprehension module 120.

At least one characteristic of the user is determined by processing the data using one or more machine learning techniques (block 904). By way of example, the profiling module 132 determines at least one characteristic of the user corresponding to the user profile 138 by processing the data generated at block 902. In particular, the profiling module 132 uses one or more machine learning techniques to process this data and determine the at least one characteristic. Examples of machine learning techniques that the profiling module 132 can use include, for instance, supervised learning where a machine-learning model is trained using training examples that include data structured similarly to the data generated at block 902 (e.g., having the same data fields but with potentially different values) but also data with an observed value for the characteristic to be determined. In any case, the profiling module 132 is configured to store data describing the determined at least one characteristic in the predicted traits 234 data of the user profile 138.

A selection of information for facilitating the user's comprehension of an agreement is presented while the user interacts with the agreement (block 906). In accordance with the principles discussed herein, the selection is based on content of the agreement and the at least one characteristic. By way of example, the agreement comprehension tool 116 presents the excerpts 534, 536 and/or the query answer 532, though in this scenario, such information may not be presented responsive to a received query from the user. Instead, the agreement comprehension tool 116 may present this information simply while the user 520 navigates through the agreement 126, such as responsive to receiving a navigation input that causes a particular portion of the agreement 126 to be displayed via the display device 512. In any case, the information is presented based on content of the agreement 126 and the at least one characteristic, as described by the predicted traits 234.

Having described example procedures in accordance with one or more implementations, consider now an example system and device that can be utilized to implement the various techniques described herein.

Example System and Device

Figure 10:
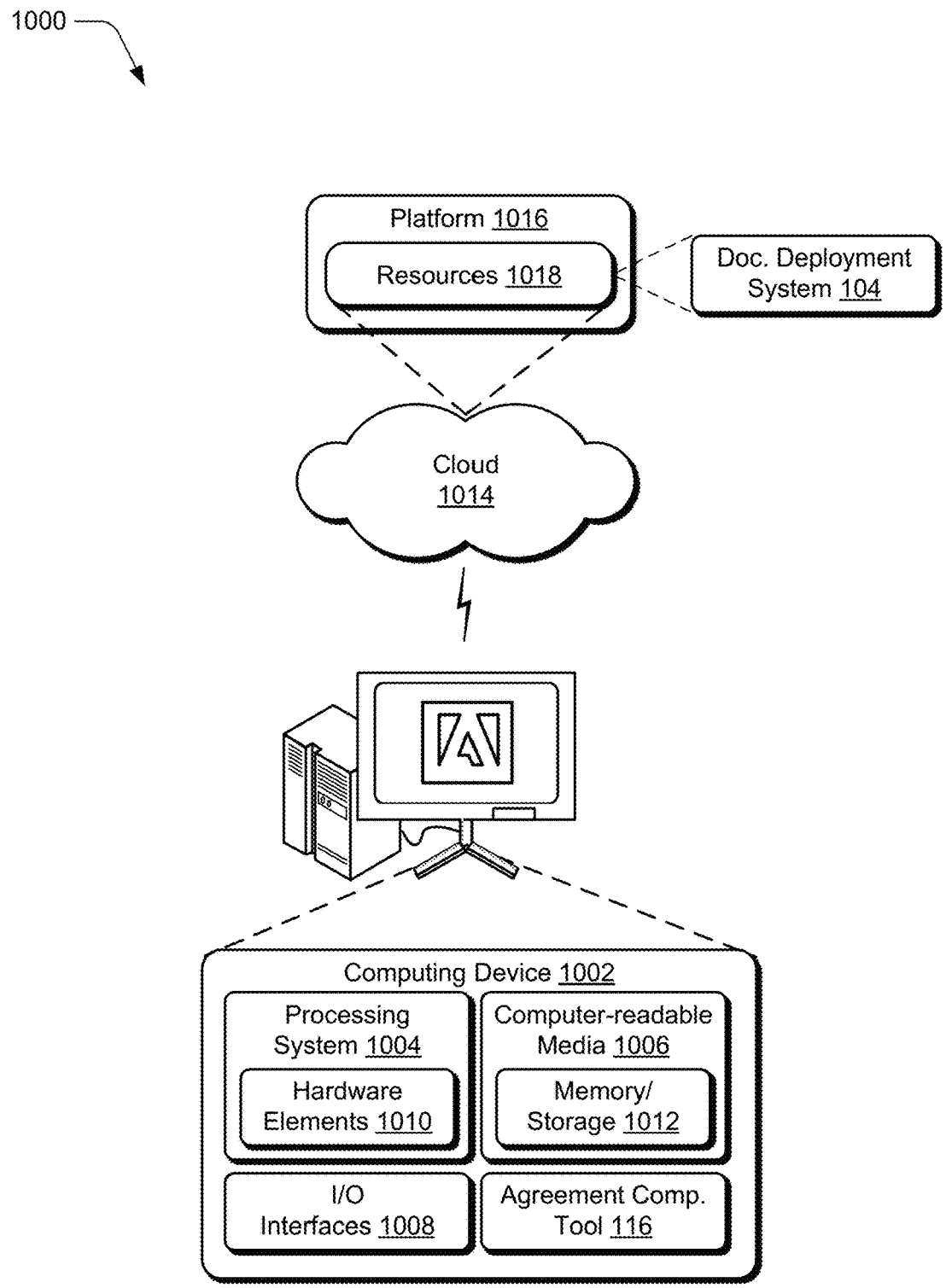
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 1002 that is representative of one or more computing systems and/or devices that may implement the various techniques described herein. This is illustrated through inclusion of the agreement comprehension tool 116 and the document deployment system 104. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, the method comprising:
    presenting, via a display device, an agreement for digital signing by a user that is a signing party to the agreement;
    receiving, via a voice assistant platform, a query from the user about the agreement;
    determining, based on the user having at least one previous interaction with a digital assistant, that the user is comfortable interacting with digital assistants;
    responsive to determining that the user is comfortable interacting with digital assistants, determining an answer to the query by processing a limited set of documents relevant to the agreement using a natural language processing (NLP) technique, the limited set of documents including a corpus of documents corresponding to an authoring organization of the agreement and previous agreements with which at least one of the user or an organization associated with the user has interacted; and
    presenting the answer at least one of visually via the display device or audibly via the voice assistant platform.

2. A method as described in claim 1, wherein the limited set of documents further includes an additional corpus of documents corresponding to the organization associated with the user.

3. A method as described in claim 2, wherein the additional corpus of documents includes both agreements and other documents maintained by a document deployment system on behalf of the organization associated with the user.

4. A method as described in claim 1, wherein the organization associated with the user is an employer of the user.

5. A method as described in claim 1, further comprising identifying at least one excerpt from the agreement and the limited set of documents that supports the answer.

6. A method as described in claim 5, further comprising presenting the at least one excerpt concurrently with the answer.

7. A method as described in claim 1, further comprising receiving a digital signature of the user to the agreement via a user interface.

8. A method as described in claim 7, wherein receipt of the digital signature is effective to bind at least one of the user or the organization associated with the user to terms of the agreement, wherein the user is an agent of the organization.

9. A method as described in claim 1, further comprising receiving the agreement from a document deployment service responsive to a selection of the user to digitally sign the agreement.

10. A method as described in claim 1, further comprising:
    tracking interaction of the user with the agreement; and
    communicating data describing tracked interactions with the agreement to a service provider system, the data describing the tracked interactions with the agreement used to customize a channel of digital content served to the user.

11. A method as described in claim 1, wherein the answer to the query is not automatically determined and presented responsive to determining that the user is not comfortable interacting with digital assistants based on the user having no previous interaction with a digital assistant.

12. A system comprising:
    a display module implemented at least partially in hardware of at least one computing device to cause display of an agreement for digital signing by a user and display of an answer to a query received from the user about at least one portion of the agreement;
    a voice assistant platform implemented at least partially in the hardware of the at least one computing device to receive the query of the user and cause audible output of the answer; and an agreement comprehension tool implemented at least partially in the hardware of the at least one computing device to determine the answer to the query, the answer determined responsive to a determination that the user is comfortable interacting with digital assistants based on the user having at least one previous interaction with a digital assistant, and the answer determined further by processing a limited set of documents relevant to the at least one portion using natural language processing (NLP), the limited set of documents including a corpus of documents corresponding to an authoring organization of the agreement and previous agreements with which at least one of the user or an organization associated with the user has interacted.

13. A system as described in claim 12, wherein the at least one computing device includes a dedicated voice assistant device and the voice assistant platform receives the query and causes the audible output of the answer using the dedicated voice assistant device.

14. A system as described in claim 12, wherein the agreement comprehension tool is further configured to temporarily restrict user navigation in relation to an identified portion of the agreement.

15. A system as described in claim 14, wherein the agreement comprehension tool is further configured to emphasize the identified portion of the agreement while the user navigation is temporarily restricted.

16. A system as described in claim 12, wherein the agreement comprehension tool is further configured to provide the query received from the user to a document deployment system, the query as provided configured to serve as agreement-authoring feedback for the authoring organization.

17. A system as described in claim 12, wherein the limited set of documents further includes at least one document specified by the user or a different user of the organization associated with the user for inclusion as part of the limited set of documents.

18. A system as described in claim 12, wherein the agreement comprehension tool is further configured to determine that the user is comfortable interacting with digital assistants based on a machine-learning model that predicts whether users are comfortable with digital assistants given, as input, data describing interactions of the users with at least one digital content item, with which other users observed to interact with digital assistants, have interacted.

19. A method implemented by at least one computing device, the method comprising:
presenting, via a display device, a document for review by a user;
receiving, via a voice assistant platform, a query of the user about at least one portion of the document;
determining, based on the user having at least one previous interaction with a digital assistant, that the user is comfortable interacting with digital assistants;
responsive to determining that the user is comfortable interacting with the digital assistants, determining an answer to the query based on a limited set of additional documents relevant to the at least one portion, the limited set of additional documents including a corpus of the additional documents corresponding to an authoring organization of the document and the additional documents the user has previously reviewed; and
presenting the answer at least one of visually via the display device or audibly via the voice assistant platform.

20. A method as described in claim 19, wherein the document is an agreement and the user is a signing party to the agreement.

* * * * *